US011412061B1

(12) United States Patent
Guo et al.

(10) Patent No.: US 11,412,061 B1
(45) Date of Patent: Aug. 9, 2022

(54) MOBILE-ASSISTED EDGE COMPUTING FRAMEWORK FOR EMERGING IOT APPLICATIONS

(71) Applicant: National University of Defense Technology, Hunan (CN)

(72) Inventors: Deke Guo, Hunan (CN); Long Zheng, Hunan (CN); Lailong Luo, Hunan (CN); Xinyi Li, Hunan (CN); Siyuan Gu, Hunan (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 0 days.

(21) Appl. No.: 17/542,227

(22) Filed: Dec. 3, 2021

(51) Int. Cl.
*H04L 67/5681* (2022.01)
*H04W 4/50* (2018.01)
*H04L 67/12* (2022.01)
*H04L 67/60* (2022.01)

(52) U.S. Cl.
CPC .......... *H04L 67/2847* (2013.01); *H04L 67/12* (2013.01); *H04L 67/32* (2013.01); *H04W 4/50* (2018.02)

(58) Field of Classification Search
CPC ..... H04L 67/2847; H04L 67/12; H04L 67/32; H04W 4/50
See application file for complete search history.

(56) References Cited

U.S. PATENT DOCUMENTS

| | | | | |
|---|---|---|---|---|
| 2017/0287062 | A1* | 10/2017 | Gupta | G06Q 30/08 |
| 2018/0139726 | A1* | 5/2018 | Choi | H04L 67/1082 |
| 2020/0195497 | A1* | 6/2020 | Obaidi | H04L 41/5051 |
| 2021/0021431 | A1* | 1/2021 | Guim Bernat | H04L 47/781 |
| 2021/0119962 | A1* | 4/2021 | Ramia | H04L 65/1069 |

* cited by examiner

*Primary Examiner* — Brandon J Miller
(74) *Attorney, Agent, or Firm* — Dragon Sun Law Firm, PC; Jinggao Li, Esq.; Nathaniel Perkins

(57) ABSTRACT

A Mobile-Assisted edge computing framework including: one or more requests to be processed; an operator configured to assign the one or more requests to a static edge node; and a cloud configured to cache and pre-fetch services for the one or more requests; wherein the one or more requests include handled requests and unhandled requests, the static edge node is configured to process the handled requests, and one or more mobile edge nodes are configured to process the unhandled requests; and wherein the static edge node is configured to auction the unhandled requests to the one or more mobile edge nodes, the auction including: generating a candidate set of the one or more mobile edge nodes; assigning an unhandled request to a target mobile edge node of the candidate set; and processing the unhandled request via the target mobile edge node.

20 Claims, 8 Drawing Sheets

MOBILE-ASSISTED EDGE COMPUTING FRAMEWORK FOR EMERGING IOT APPLICATIONS

TECHNICAL FIELD

The present disclosure relates to the field of edge computing, and more particularly relates to a Mobile-Assisted edge computing framework.

BACKGROUND

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference is individually incorporated by reference. In terms of notation, hereinafter, [n] represents the nth reference cited in the reference list. For example, [1] represents the first reference cited in the reference list, namely, GMSA, "GSMA intelligence," https://www.gsmaintelligence.com/, Accessed On: February 2019.

As Internet of Things (IoT) devices become increasingly prevalent, new IoT applications such as mobile gaming, video processing, and image recognition have emerged and are frequently used [1]. The IoT applications are often delay sensitive, resource hungry and computation intensive. However, the IoT devices tend to be designed to be more flexible and easier to transport, which may limit the processing power of the devices. In response, edge computing (EC) may be used as a paradigm that caches services and provides cloud-like resources via static edge nodes (i.e., edge clouds, cloudlets, follow me clouds, fogs, etc.) at the network edge [2]. Each edge node is typically composed of an access point (i.e., base station) and multiple edge servers.

However, even with static edge nodes, low latency requirements of the IoT applications may still not be temporally and spatially guaranteed. It may be observed that the supply-demand mismatch between a resource supply capacity of static edge nodes and the demand of end users results in failure to meet low latency requirements. The causes of the mismatch may be roughly classified into the following two categories: 1) resources (e.g., computational and storage resources) of existing static edge nodes cannot meet the demand of end users, and 2) resources of static edge nodes may not be able to handle peak resource consumption of the users. From the perspective of the deployment of static edge nodes, due to limited caching space and computing resources of static edge nodes, it is difficult for a single edge node to handle all nearby user requests. In constructing existing EC environments, enhancing the resource capacity of each single node or adding new edge nodes may cost additional resources. If the budget for constructing the existing EC environment does not meet the expected revenue, construction will not take place, and the total resources of the EC environment may not have the capacity to meet resource demands of users over an extended period of time.

2) When the users' demand for a particular application reaches a peak demand, the resources of nearby static edge nodes may not be able to meet the needs of the end users. For example, a large number of application requirements are requested for in a particular region, but immediate static edge nodes cannot cache the corresponding application services in advance. In this situation, users may need to wait for re-caching or choose other solutions. In another example, even if the edge node pre-caches such services, the computational resource of the edge node may still be insufficient. The former situation emphasizes a shortage of overall resources in time and space distribution, while the latter situation emphasizes a shortage of resources caused by dynamic demand.

To solve the supply-demand mismatch problem, many efforts have been devoted to make up for the shortage of static edge nodes' resources. Prevalent topics in the field of EC explore paying close attention to pre-fetching and caching corresponding services from the remote cloud to static edge nodes (a.k.a., service provisioning [3], service placement [4]) in order to respond to user requests quickly. However, frequent cache operations will affect the stability of the network and generate additional long-term cost. Several solutions utilize device-to-device collaboration, (i.e., D2D fogging [5]), to respond to some end users' requests. However, it may be difficult to guarantee security and establish trust between the end user and other devices providing the resources. Furthermore, several solutions [6] [7] attempt to schedule excessive user requests from a static edge node to the neighboring static edge nodes for processing through a backhaul network, but typically results in an unpredictable delay. In the worst case, when the total resources of static edge nodes cannot meet the required resources of the end users, many requests will be scheduled to the remote cloud for processing, which may result in an even greater delay.

Beyond the aforementioned conventional solutions, another resource to consider is mobile devices, including smart cars [8], UAVs [9], robots [10], etc. The mobile devices each have the following properties: 1) Considerable resources. The deployment of mobile devices is extensive and large. Each mobile device has built-in services (a.k.a., API toolkits, data, and programs) and ample computational resources. Significantly, mobile devices typically have idle time periods. 2) Mobility. With the rise of smart cities and intelligent transportation, an increasing number of devices are able to move at will (i.e., mobile devices). The mobile devices may contribute resources across regions by constantly moving according to users' needs.

Therefore, a heretofore unaddressed need exists in the art to address the aforementioned deficiencies and inadequacies.

SUMMARY

Existing EC paradigms aim to provide users with a low latency experience by pre-fetching cloud-like services at the network edge. However, in response to the supply-demand mismatch, many improvements may still be made. In order to realize flexible service caching at the network edge, there is often a domain operator responsible for caching decisions. The domain operator connects with the static edge nodes via backhaul network. When the EC environment is overloaded and cannot handle all user requests, the domain operator typically uploads unhandled user requests to a remote cloud with enough capacity for processing. However, redirecting these requests to the cloud may invalidate delay requirements. This deviates from the original intention of EC to provide low latency services. To address this issue, the present embodiment may utilize potential mobile edge nodes (i.e. mobile devices with idle resources), in contrast to static edge nodes like the stationary base stations or access points.

The mobile edge nodes may be integrated into existing EC environments to solve the current mismatch problem more effectively.

Challenges & Contributions: Solving the supply-demand mismatch problem at the network edge is challenging due to: 1) non-trivial costs associated with utilizing potential mobile devices to serve as mobile edge nodes and accommodate users' requests; 2) allocation of requests to suitable static edge nodes and scheduling available mobile edge nodes to assist appropriate static edge nodes; and 3) stimulating large numbers of potential mobile edge nodes with specific services to move to a specific region for responding to user requests.

The present embodiment may be used to solve the supply-demand mismatch problem at the network edge by combining the inherent EC environment and available mobile edge nodes. The present embodiment makes the following contributions: 1) In solving the supply-demand mismatch problem, a mobile-assisted edge computing framework is implemented by introducing and fully utilizing a large number of potential mobile edge nodes. 2) To enable the realization of the framework, a CRI (Credible, Reciprocal, and Incentive) auction mechanism is used to attract mobile devices as mobile edge nodes. Rigorous theoretical analysis is also conducted to prove the feasibility of the CRI design. 3) Experiments are conducted to verify performance (i.e., higher efficiency and profit) of the edge computing framework and the desirable properties (i.e., individual rationality, truthfulness and profit maximization) of the CRI mechanism.

In one embodiment, a Mobile-Assisted edge computing framework is described, including: one or more requests to be processed; a static edge node including an access point (AP) and an edge server; one or more mobile edge nodes; an operator configured to assign the one or more requests to the static edge node; and a cloud configured to cache and pre-fetch services for the one or more requests; wherein the one or more requests include handled requests and unhandled requests, the static edge node is configured to process the handled requests, the unhandled requests include requests unable to be processed by the static edge node, the one or more mobile edge nodes are configured to process the unhandled requests, and the static edge node is configured to auction the unhandled requests to the one or more mobile edge nodes, the auction including: generating a candidate set of the one or more mobile edge nodes; assigning an unhandled request to a target mobile edge node of the candidate set; and processing the unhandled request via the target mobile edge node; wherein the generating includes: selecting a subset of requests to be processed at a time slot from the one or more requests; receiving bids for the subset from the one or more mobile edge nodes; comparing a remote cloud task completion time and a mobile edge node task completion time; and generating the candidate set based on the bids and the comparing.

In another embodiment, the bids are calculated by the one or more mobile edge nodes according to the mobile edge node task completion time, and the mobile edge node task completion time is calculated according to:

$$T_{i^t m^t} = I_{i^t} / D_{i^t n_{i^t}} + I_{i^t} / D_{n_{i^t} m^t} + K_{i^t} / c_{m^t} + O_{i^t} / D_{m^t n_{i^t}} + O_{i^t} / D_{n_{i^t} i^t}$$

wherein $T_{i^t m^t}$ is the mobile edge node task completion time, $i^t$ denotes the unhandled request of a corresponding end user, $m^t$ denotes a mobile edge node, $I_{i^t}$ is an input data size of the unhandled request, $K_{i^t}$ is an amount of required computational resources required for the unhandled request, $O_{i^t}$ is an output data size of the unhandled request, $c_{m^t}$ is an available processing capacity of the mobile edge node, $$D_{i^t n_{i^t}}$$

is a user-to-edge transmission rate, and $$D_{n_{i^t} m^t}$$

is an edge-to-mobile edge node transmission rate.

In another embodiment, $$I_{i^t} / D_{i^t n_{i^t}} + I_{i^t} / D_{n_{i^t} m^t}$$

is a task uploading time, $K_{i^t}/c_{m^t}$ is a task processing time, and $$O_{i^t} / D_{m^t n_{i^t}} + O_{i^t} / D_{n_{i^t} i^t}$$

is a task downloading time.

In another embodiment, the assigning includes: constructing a weighted bipartite graph G including subgraphs $G^n$ according to the static edge node, where $G = \{G^1, G^2, \ldots, G^N\}$ and N is the number of subgraphs; and solving a Maximum Matching (MM) problem using the weighted bipartite graph.

In another embodiment, the weighted bipartite graph is constructed according to a set of the one or more user requests, the candidate set, and a profit of the static edge node.

In another embodiment, the profit of the static edge node is calculated according to:

$$profit_{i^t m^t} = \begin{cases} v_{i^t} - p_{i^t}, & \text{if } T_{i^t m^t} \leq T_{i^t}^{DDL}, \\ v_{i^t} - p_{i^t} - F_p^{i^t}(T_{i^t m^t} - T_{i^t}^{DDL}), & \text{if } T_{i^t m^t} > T_{i^t}^{DDL}. \end{cases}$$

where $profit_{i^t m^t}$ is the profit of the static edge node, $v_{i^t}$ is a valuation of the unhandled request for the static edge node, $p_{i^t}$ is a price of the unhandled request, $T_{i^t}^{DDL}$ is a deadline of task completion time, and $F_p^{i^t}$ is a penalty function.

In another embodiment, the MM problem is solved using a Kuhn-Munkres (KM) algorithm.

In another embodiment, after the processing, the target mobile edge node is configured to submit a Proof of Participation (PoP) to the static edge node, wherein the PoP includes an equipment identification number used to identify and track unique mobile edge nodes.

In another embodiment, when the target mobile edge node submits the PoP but does not complete the unhandled request, a reputation of the target mobile edge node is damaged.

In another embodiment, when the target mobile edge node does not complete the unhandled request within a guaranteed time, the target mobile edge node is not compensated.

In another embodiment, Proof of Assignment (PoA) is sent to the target mobile edge node before the processing and the target edge node is compensated for the processing by the static edge node based on the PoA.

In another embodiment, each mobile edge node of the one or more mobile edge nodes is a smart car, unmanned aerial vehicle (UAV) or robot.

In another embodiment, a method for processing one or more requests using a Mobile-Assisted computing framework is described including the following steps: generating a candidate set of one or more mobile edge nodes; assigning an unhandled request to a target mobile edge node of the candidate set; and processing the unhandled request via the target mobile edge node; wherein the Mobile-Assisted computing framework includes: one or more requests to be processed; a static edge node including an access point (AP) and an edge server; one or more mobile edge nodes; an operator configured to assign the one or more requests to the static edge node; and a cloud configured to cache and pre-fetch services for the one or more requests; wherein the one or more requests include handled requests and unhandled requests, the static edge node is configured to process the handled requests, the unhandled requests include requests unable to be processed by the static edge node, and the one or more mobile edge nodes are configured to process the unhandled requests; and the static edge node is configured to auction the unhandled requests to the one or more mobile edge nodes; and wherein the generating includes: selecting a subset of requests to be processed at a time slot from the one or more requests; receiving bids for the subset from the one or more mobile edge nodes; comparing a remote cloud task completion time and a mobile edge node task completion time; and generating the candidate set based on the bids and the comparing.

In another embodiment, the bids are calculated by the one or more mobile edge nodes according to the mobile edge node task completion time, and the mobile edge node task completion time is calculated according to:

$$T_{i^t m^t} = I_{i^t} / D_{i^t n_{i^t}} + I_{i^t} / D_{n_{i^t} m^t} + K_{i^t} / c_{m^t} + O_{i^t} / D_{m^t n_{i^t}} + O_{i^t} / D_{n_{i^t} i^t}$$

wherein $T_{i^t m^t}$ is the mobile edge node task completion time, $i^t$ denotes the unhandled request of a corresponding end user, $m^t$ denotes a mobile edge node, $I_{i^t}$ is an input data size of the unhandled request, $K_{i^t}$ is an amount of required computational resources required for the unhandled request, $O_{i^t}$ is an output data size of the unhandled request, $c_{m^t}$ is an available processing capacity of the mobile edge node, $$D_{i^t n_{i^t}}$$

is a user-to-edge transmission rate, and $$D_{n_{i^t} m^t}$$

is an edge-to-mobile edge node transmission rate; and $$I_{i^t} / D_{i^t n_{i^t}} + I_{i^t} / D_{n_{i^t} m^t}$$

is a task uploading time, $K_{i^t}/c_{m^t}$ is a task processing time, and $$O_{i^t} / D_{m^t n_{i^t}} + O_{i^t} / D_{n_{i^t} i^t}$$

is a task downloading time.

In another embodiment, the assigning includes: constructing a weighted bipartite graph G including subgraphs $G^n$ according to the static edge node, where $G=\{G^1, G^2, \ldots, G^N\}$ and N is the number of subgraphs; and solving a Maximum Matching (MM) problem using the weighted bipartite graph; wherein the weighted bipartite graph is constructed according to a set of the one or more user requests, the candidate set, and a profit of the static edge node; and the MM problem is solved using a Kuhn-Munkres (KM) algorithm.

In another embodiment, the profit of the static edge node is calculated according to:

$$profit_{i^t m^t} = \begin{cases} v_{i^t} - p_{i^t}, & \text{if } T_{i^t m^t} \leq T_{i^t}^{DDL}, \\ v_{i^t} - p_{i^t} - F_p^{i^t}(T_{i^t m^t} - T_{i^t}^{DDL}), & \text{if } T_{i^t m^t} > T_{i^t}^{DDL}. \end{cases}$$

where $profit_{i^t m^t}$ is the profit of the static edge node, $v_{i^t}$ is a valuation of the unhandled request for the static edge node, $p_{i^t}$ is a price of the unhandled request, $T_{i^t}^{DDL}$ is a deadline of task completion time, and $F_p^{i^t}$ is a penalty function.

In another embodiment, after the processing, the target mobile edge node is configured to submit a Proof of Participation (PoP) to the static edge node, wherein the PoP includes an equipment identification number used to identify and track unique mobile edge nodes.

In another embodiment, when the target mobile edge node submits the PoP but does not complete the unhandled request, a reputation of the target mobile edge node is damaged.

In another embodiment, Proof of Assignment (PoA) is sent to the target mobile edge node before the processing and the target edge node is compensated for the processing by the static edge node based on the PoA.

In another embodiment, each mobile edge node of the one or more mobile edge nodes is a smart car, unmanned aerial vehicle (UAV) or robot.

BRIEF DESCRIPTION OF THE DRAWINGS

The accompanying drawings illustrate one or more embodiments of the present disclosure and, together with the written description, serve to explain the principles of the present disclosure, wherein:

FIG. 3A-3B illustrate an exemplary conversion of an auction problem into a bipartite graph, wherein FIG. 3A shows an auction problem and FIG. 3B shows a bipartite graph, in accordance with an embodiment of the present disclosure;

FIG. 4A-4B illustrate exemplary supply-demand mismatch graphs, wherein FIG. 4A shows a supply-demand graph and FIG. 4B shows a parameter setting graph, in accordance with an embodiment of the present disclosure;

FIG. 5A-5B illustrate comparisons between CRI, greedy assignment (GA), and All up to clouds (AC), wherein FIG. 5A shows task completion rate comparison and FIG. 5B shows profit comparison, in accordance with an embodiment of the present disclosure;

FIG. 6A-6B illustrate graphs depicting individual rationality of CRI, wherein FIG. 6A shows valuations and prices of winning tasks and FIG. 6B shows bids and costs of winning mobile edge nodes, in accordance with an embodiment of the present disclosure;

FIG. 7A-7B illustrate graphs of CRI criteria, wherein FIG. 7A shows truthfulness and FIG. 7B shows profit maximization, in accordance with an embodiment of the present disclosure.

DETAILED DESCRIPTION

Figure 1:
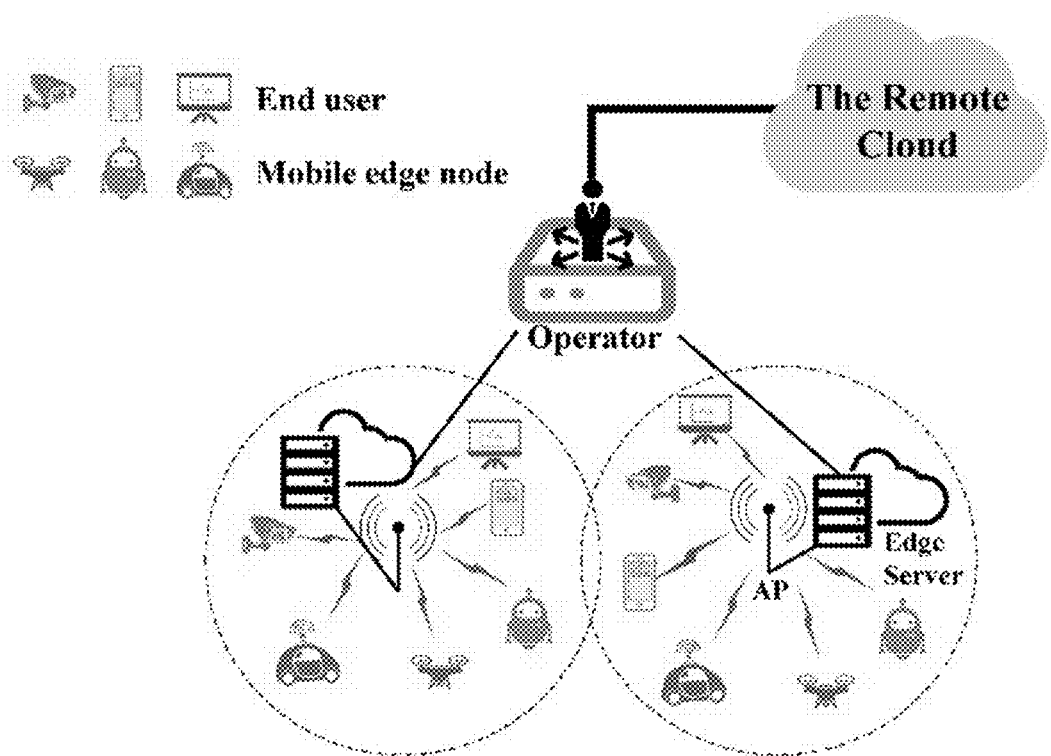
FIG. 1 illustrates an exemplary mobile-assisted edge computing framework, in accordance with an embodiment of the present disclosure.

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the present disclosure to those skilled in the art. Like reference numerals refer to like elements throughout.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It is appreciated that the same thing may be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the present disclosure or of any exemplified term. Likewise, the present disclosure is not limited to various embodiments given in this specification.

It is understood that when an element is referred to as being "on" another element, it may be directly on the other element or intervening elements may be present therebetween. In contrast, when an element is referred to as being "directly on" another element, there are no intervening elements present. As used herein, the term "and/or" includes any and all combinations of one or more of the associated listed items.

It is understood that, although the terms Firstly, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below may be termed a second element, component, region, layer or section without departing from the teachings of the present disclosure.

It is understood that when an element is referred to as being "on," "attached" to, "connected" to, "coupled" with, "contacting," etc., another element, it may be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It is also appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the present disclosure. As used herein, the singular forms "a," "an," and "the" are intended to include the multiple forms as well, unless the context clearly indicates otherwise. It is further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It is understood that relative terms are intended to encompass different orientations of the device in addition to the orientation shown in the figures. For example, if the device in one of the figures is turned over, elements described as being on the "lower" side of other elements will then be oriented on the "upper" sides of the other elements. The exemplary term "lower" may, therefore, encompass both an orientation of lower and upper, depending on the particular orientation of the figure. Similarly, for the terms "horizontal", "oblique" or "vertical", in the absence of other clearly defined references, these terms are all relative to the ground. Similarly, if the device in one of the figures is turned over, elements described as "below" or "beneath" other elements will then be oriented "above" the other elements. The exemplary terms "below" or "beneath" may, therefore, encompass both an orientation of above and below.

Unless otherwise defined, all terms (including technical and scientific terms) used herein have the same meaning as commonly understood by one of ordinary skill in the art to which the present disclosure belongs. It is further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially," "generally" or "approximately" shall generally mean within 20 percent, preferably within 10 percent, and more preferably within 5 percent of a given value or range. Numerical quantities given herein are approximate, meaning that the terms "around," "about," "substantially," "generally" or "approximately" may be inferred if not expressly stated.

As used herein, the terms "comprise" or "comprising," "include" or "including," "carry" or "carrying," "has/have" or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

Embodiments of the present disclosure are illustrated in detail hereinafter with reference to accompanying drawings. It should be understood that specific embodiments described herein are merely intended to explain the present disclosure, but not intended to limit the present disclosure.

In order to further elaborate the technical means adopted by the present disclosure and its effect, the technical scheme of the present disclosure is further illustrated in connection with the drawings and through specific mode of execution, but the present disclosure is not limited to the scope of the implementation examples.

The present disclosure relates to the field of edge computing, and more particularly relates to a Mobile-Assisted edge computing framework.

The Framework of Mobile-Assisted Edge Computing

The Supply-Demand Mismatch Problem

The mismatch problem between capacity provision and user demands for emerging IoT applications at the network edge has become an urgent problem to be solved. Meanwhile, in future EC environments, the computational capacity of static edge nodes may not be able to satisfy peak user demands, especially peak latency-sensitive requests. The supply-demand mismatch problem may be caused by two reasons: 1) The static edge nodes of EC environment cannot be widely promoted and deployed at will, due to expenses related to deployment and maintenance. In this case, the total resource of all static edge nodes may not be able to meet the total demand of end users. 2) It is very common that the peak demand for certain services occurs at an uncertain time. When peak demand occurs, the adjacent static edge nodes may not have sufficient computational resource and corresponding pre-cached services, eventually resulting in an increase in waiting time of user requests and a decline in the end-user experience.

Overview of the Framework

Mobile devices may be characterized as mobile edge nodes with desirable properties (i.e., considerable resources and the mobility). Mobile devices such as smart cars, unmanned aerial vehicles (UAVs) and robots typically have the ability to receive and send information via wireless networks, similar to the access point. These mobile devices have certain computational and storage resources, and as such may act as servers of static edge nodes [11-13]. Thus, such mobile devices may be utilized as mobile edge nodes. The category of the mobile edge node may also not be fixed. Any new mobile devices with access functionality, processing capacity and mobility may act as a mobile edge node.

As shown in FIG. 1, an EC framework includes a set of static edge nodes, each of which is composed of an access point (AP) and an edge server. There exists a set of end users, a domain operator and the remote cloud. The mobile-assisted edge computing framework utilizes a set of mobile edge nodes to address the aforementioned mismatch problem. The operator may be a processor, a computer, a server, or other technology configured to assign tasks from end users to edge nodes.

It may be emphasized that the operator makes the service caching decision in a time frame manner and request scheduling decision in a time slot manner. The time slot is of a much smaller scale than the time frame, and both the time frame and the time slot are controlled by the operator. When the entire EC environment is overloaded or some requested services are not pre-fetched from the remote cloud, some user requests may not be processed at the network edge. However, with CRI (to be described in detail below) in the new EC framework, the operator will permit processes of end users an additional chance to be processed at the network edge instead of via the remote cloud.

In the framework of the present embodiment, the set of static edge nodes may be denoted by $N=\{1, 2, \ldots, n, \ldots, N\}$. Continuous integers $T=\{0, 1, 2, \ldots\}$ may be used to describe the starting time point of each time slot. It should be noted that time is divided into equal periods and the time slots are continuous. Additionally, the services that may be requested in the EC environment may be denoted by $S=\{1, 2, \ldots, s, \ldots, S\}$. At time slot t, mobile edge nodes may be denoted by $M^t=\{1^t, 2^t, \ldots, m^t, \ldots, M^t\}$ and the generated user requests that cannot be processed in static edge nodes may be denoted by $U^t=\{1^t, 2^t, \ldots, U^t\}$, and may be referred to as waiting user requests. User requests to be processed by the static edge nodes may be referred to as handled user requests, while user requests unable to be processed by the static edge nodes may be referred to as unhandled user requests. For each user request $i^t \in U^t$, the operator will provide a second opportunity to be processed at the network edge with the help of CRI.

For ease of reference, primary notations are listed in Table 1.

TABLE 1

Summary of notations

| Notation | Description |
| --- | --- |
| N | the set of static edge nodes |
| $M^t$ | the set of mobile edge nodes at time slot t |
| S | the set of services |
| $U^t$ | the set of waiting user requests at time slot t |
| T | the set of starting times of all time slots |
| $s_{i^t}$ | the service for task $i^t$ |
| $I_{i^t}$ | the input data size of the task $i^t$ |
| $O_{i^t}$ | the output data size of the task $i^t$ |
| $K_{i^t}$ | the required computational resources for the task $i^t$ |
| $L_{i^t}$ | the number of time slots for maximum delay of task $i^t$ |
| $n_{i^t}$ | the static edge node where task $i^t$ is covered |
| $C_{m^t}$ | the available processing capacity of $m^t$ |
| $C_r$ | the processing capacity of the cloud center |
| $D_{i^t n_{i^t}}$ | the 'user-to-edge' transmission rate |
| $D_{n_{i^t} m^t}$ | the 'edge-to-mobile edge node' transmission rate |
| $T_{i^t}^{DDL}$ | the deadline of task completion time |
| $b_{i^t m^t}$ | the bid of mobile edge node $m^t$ for task $i^t$ |
| $c_{i^t m^t}$ | the cost of the mobile edge node for processing task $i^t$ |
| $profit_{i^t m^t}$ | the profit of the static edge node for auctioning |

Resource Model

For both static edge nodes and mobile edge nodes, similar resources are involved in the mobile-assisted edge computing framework as follows:

1) Network link: It should be emphasized that each end user or mobile edge node in this framework may establish a cellular link with an AP. It may also be assumed that the bandwidth is large enough in a 5G era for the end user or mobile edge node to establish links. The operator is connected with static edge nodes by the backhaul network which provides for an efficient routing option. The remote cloud caches many services needed at the network edge and is typically deployed distant from end users. The remote cloud may link to static edge nodes via the backbone network, but with a large time latency, which may be unacceptable for delay-sensitive user requests. Scheduling to the remote cloud may still be time-consuming.

2) Caching capacity: the static edge nodes may be designed with flexible service caching capacity at the network edge. The static edge nodes may be used to realize a fast caching function via technologies such as containers [14] or virtual machines [15]. Thus, rapidly caching different services with corresponding toolkits, settings, algorithms, etc. may be possible. In contrast with static edge nodes, mobile edge nodes are equipped with specific services and thus may only realize specific functions. An assumption that mobile edge nodes are pre-deployed with specific services may significantly limit applications as it may not be guaranteed that the mobile edge nodes are spatially present. However, the option to utilize mobile edge nodes is a significant improvement to conventional solutions. For example, without limitation, a large number of mobile devices on site may support existing edge servers in a natural disaster emergency, battlefield and future urban scenes [16]. Additionally, the remote cloud caches all the needed services with abundant storage resources. In contrast, the storage resource of the edge nodes and mobile edge nodes may be limited, and may not be able to cache a large number of services. It should be emphasized that edge nodes may pre-cache services at each time frame with a flexible caching capacity.

3) Computational capacity: In general, the computational capacity of static edge nodes and mobile edge nodes may correspond to the capacity of processing user requests. This relates to the performance of CPU, GPU, TPU and so on. Computational capacity relates to the amount of processed tasks per unit time or the time required to process a same request. User requests $U^t$ that cannot be processed in static edge nodes in each time slot may be regarded as tasks to be processed by the potential mobile edge nodes.

CRI Design

To prompt mobile edge nodes to voluntarily participate in the EC environment, the CRI (Credible, Reciprocal, and Incentive) auction mechanism is proposed. CRI realizes a reciprocity between mobile edge nodes and the operator by utilizing a reward system such that a market mechanism may be formed. As a member of the market environment, mobile edge nodes tend to pursue maximization of their own interests. When computational resources are idle, if profitable, incentives in the market environment may encourage mobile edge nodes to process tasks scheduled by the operator.

Figure 2:
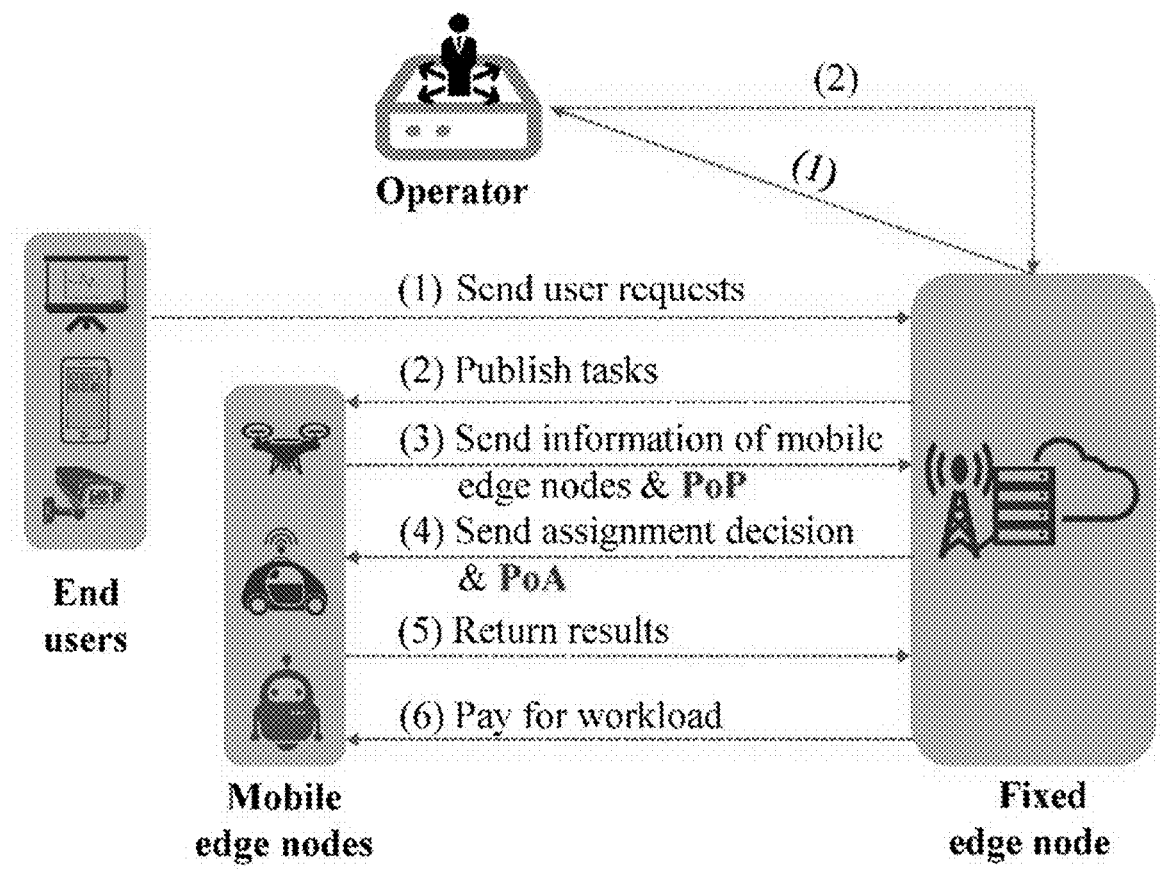
FIG. 2 illustrates an exemplary message sequence diagram of a CRI auction mechanism, in accordance with an embodiment of the present disclosure.

In an EC environment, five components are considered, including, without limitation, the end users, the service providers, the infrastructure providers, the mobile edge nodes, and the remote cloud. 1) End users represent the holders of user devices and pursue an optimal user-experience. 2) Service providers provide end users with a wide range of services. Service providers may deploy services at static edge nodes, mobile edge nodes, the remote cloud, etc. 3) Infrastructure providers, such as static edge nodes and the remote cloud, provide computing, storage, communication and other resources. 4) Mobile edge nodes may assist static edge nodes to accommodate for corresponding service requests. While processing tasks from static edge nodes, mobile edge nodes operate independently, including calculating task completion times (refer to Equation (1) below), providing bids, and planning corresponding moving paths. The system may not be aware of which mobile device will move to which edge's area. On the contrary, each mobile edge node may plan its own trajectory (e.g., stay in place or move to a specific location) based on the receiving task and the predicted task completion time. After the mobile device moves according to a planned path, the mobile device may predict its own location when the task is completed. 5) The remote cloud caches all the services required by end users and may be assumed to be an unlimited network resource. In an EC environment, end users pay service providers and infrastructure providers for servicing user requests. To stimulate mobile edge nodes to process unhandled user requests, the operator must compensate the mobile edge nodes. It should be emphasized that each edge node auctions the locally generated user request tasks in each time slot, and the tasks for auction are decided by the domain operator. Based on the foregoing, FIG. 2 shows the framework of the CRI.

User Request Generation & Edge Tasks Determination

User requests are continuously generated from end users and sent to the operator via the AP. In each time slot, the operator will decide where to schedule the requests according to the conditions of the EC environment. The scheduling details are not described in detail herein, as they have been widely studied before [6][7].

For user requests that cannot be processed by the static edge nodes in each time slot (i.e., unhandled user requests), the operator will inform edge nodes to auction the unhandled user requests as tasks. The tasks at time slot t may be represented by $U^t$, which is also the set of corresponding user requests. Each task $i^t \in U^t$, may be characterized by a parameter tuple $<s_{i^t}, I_{i^t}, O_{i^t}, K_{i^t}, L_{i^t}, n_{i^t}>$, where $s_{i^t} \in S$ is the service needed to be pre-cached for task $i^t$, $I_{i^t}$ ($O_{i^t}$) is the input (output) data size of the task, $K_{i^t}$ is the amount of required computational resources (e.g., the CPU cycles in this tuple) required for task $i^t$, $L_{i^t} \in R^+$ is the largest number of time slots for processing the task (i.e., $L_{i^t} * T$ represents the tolerable maximum delay of task $i^t$, and T is the length of each time slot), and $n_{i^t}$ is the static edge node where the task $i^t$ is covered (where the corresponding end user is covered). Note that, the tuple may be further extended to consider other types of resources (e.g., GPU, bandwidth) by introducing additional parameters. In particular, the required communication resources need not be taken into consideration as 5G provides sufficient bandwidth [17].

---

Algorithm 1: CRI-CSG

Input: $U^t M^t S^t B^t V^t$
Output: $U^t_c M^t_c$
1    Construct the candidate tasks set $U^t_c$;
2    Construct the candidate mobile edge nodes set for $i^t$ as $M^{i^t}_c$;
3    $U^t_c \leftarrow \emptyset$; //instantiate $U^t_c$ as an empty set.
4    foreach $i^t \in U^t$ do
5      Find all the mobile edge nodes that satisfies $n_{i^t} = n_{m^t}$ and $s_{i^t} \in S_{m^t}$;

| Algorithm 1: CRI-CSG | |
|---|---|
| 6 | Sort these mobile edge nodes in the set $M^t_{i^t}$; |
| 7 | foreach $m^t \in M^t_{i^t}$ do |
| 8 | if $T_{i^t m^t} \leq T_{i^t r}$ then |
| 9 | if $T_{i^t m^t} \leq T^{DDL}_{i^t}$ then |
| 10 | if $v_{i^t} \geq b_{i^t m^t}$ then |
| 11 | $U^t_c \leftarrow i^t$; |
| 12 | $M^{i^t}_c \leftarrow m^t$; |
| 13 | end |
| 14 | else |
| 15 | if $v_{i^t} \geq b_{i^t m^t} + F^{i^t}_p (T_{i^t m^t} - T^{DDL}_{i^t})$ then |
| 16 | $U^t_c \leftarrow i^t$; |
| 17 | $M^{i^t}_c \leftarrow m^t$; |
| 18 | end |
| 19 | end |
| 20 | end |
| 21 | end |
| 22 | end |
| 23 | Construct the candidate mobile edge nodes set as $M^t_c = \cup_{i^t \in U^t} M^{i^t}_c$; |
| 24 | Return: $U^t_c$, $M^t_c$. |

Identifying Candidate Tasks and Mobile Edge Nodes

In the auction, both the edge node and the mobile edge node must ensure that the auction is profitable. The latency requirements of user requests are also critical. Thus, the candidate set of the tasks and mobile edge nodes that meet the aforementioned requirements must first be selected. The basic methodology is described with reference to Algorithm 1.

The CRI may first select the candidate tasks set $U^t_c$, which is a subset of $U^t$ indicating all the candidate tasks for the auction at time slot t. The candidate mobile edge nodes set may then be constructed for $i^t$ as $M^{i^t}_c$, which is a subset of $M^t$ indicating all the candidate mobile edge nodes for candidate user request $i^t$. The condition $n_{i^t} = n_{m^t}$ in line 5, where $n_{m^t}$ is the edge node where $m^t$ is covered, ensures that the auction procedure is executed locally. The condition $s_{i^t} \in S_{m^t}$, where $S_{m^t}$ is the services set of $m^t$, states that the mobile edge node $m^t$ only considers the tasks calling for corresponding pre-cached services. Based on this, the mobile edge node may calculate the task completion time and offer bids. In contrast with the D2D model [5] where the task may be offloaded directly between devices, instead, the task needs to be routed to the nearest edge node before the auction. Thus, the completion time is indicated by processing a task in the mobile edge node as follows:

$$T_{i^t m^t} = I_{i^t} / D_{i^t n_{i^t}} + I_{i^t} / D_{n_{i^t} m^t} + K_{i^t} / c_{m^t} + O_{i^t} / D_{m^t n_{i^t}} + O_{i^t} / D_{n_{i^t} i^t} \quad (1)$$

where $i^t$ denotes the task of the corresponding end user, $m^t$ denotes the mobile edge node for processing the task, $<K_{i^t}, I_{i^t}, O_{i^t}, n_{i^t}>$ denotes the tuple information of the task, and $c_{m^t}$ is the available processing capacity (in cycles/frame) of $m^t$. The available processing capacity is the processing capacity of a mobile device to handle the corresponding task, which may be predicted according to resource usage of the mobile device in a period of time. Although the mobile device has a variable resource supply allocated to other requests due to on-device demand changing over time (e.g., a mobile device has to satisfy its own low-latency applications' requests before it may serve other requests) it may be assumed that the mobile device may still provide the same guaranteed resource a majority of the time, because once the task is received, the mobile device may ensure that this guaranteed resource is only used to handle the task within the task processing time.

$$D_{i^t n_{i^t}}$$

denotes the 'user-to-edge' transmission rate from the end user $i^t$ to the edge node $n_{i^t}$, and $$D_{n_{i^t} m^t}$$

denotes the 'edge-to-mobile edge node' transmission rate from the edge node $n_{i^t}$ to the mobile edge node $m^t$. In addition, the transmission rate may be asymmetric, i.e., $$D_{i^t n_{i^t}} \neq D_{n_{i^t} i^t}, D_{n_{i^t} m^t} \neq D_{m^t n_{i^t}}.$$

The task completion time is composed of the task uploading time, the task processing time and the results downloading time. Thus, on the right side of equation (1), the second and third terms $$I_{i^t} / D_{i^t n_{i^t}} + I_{i^t} / D_{n_{i^t} m^t}$$

may represent the task uploading time, the first term $K_{i^t}/c_{m^t}$ may represent the task processing time in the mobile edge node, and the fourth and fifth terms $$O_{i^t} / D_{m^t n_{i^t}} + O_{i^t} / D_{n_{i^t} i^t}$$

may represent the downloading time of task processing results. Thus, $T_{i^t m^t}$ may describe the total time to complete the task in the mobile edge node.

The completion time of processing task in the remote cloud may be represented as:

$$T_{i^t r} = I_{i^t} / D_{i^t n_{i^t}} + I_{i^t} / D_{n_{i^t} r} + K_{i^t} / c_r + O_{i^t} / D_{r n_{i^t}} + O_{i^t} / D_{n_{i^t} i^t} \quad (2)$$

where r denotes the remote cloud and $$D_{n_{i^t} r}(D_{r n_{i^t}})$$

is the 'edge-to-cloud' transmission rate. The processing capacity $c_r$ of the cloud data center is extremely large. In line 8 of Algorithm 1, the condition $T_{i^t m^t} \leq T_{i^t r}$ emphasizes that the auction is desirable only when the task processed in the mobile edge node is completed in a shorter time than processed in the remote cloud. Considering that the edge node may connect to the remote cloud via high-speed wired network and the remote cloud has more computational power to reduce processing time, the condition may not be always true, which makes the comparison relevant.

Furthermore, auction may still be a better choice even if the deadline of task completion time (denoted by $T_{i^t}^{DDL}$) is exceeded. If so, it will cost more for the time beyond the deadline, where a penalty function $F_p^{i^t}(.)$ may represent the extra cost. In the input of Algorithm 1, $B^t$ is the set of bids and $V^t$ is the set of values. Specifically, $b_{i^tm^t} \in B^t$ denotes the bid of mobile edge node $m^t$ for task $i^t$. Lines 10-18 of Algorithm 1 show that if the valuation of task $i^t$ for the static edge node (denoted by $v_{i^t} \in V^t$) is larger than the maximum possible cost incurred by processing $i^t$, where the cost is $b_{i^tm^t}$ ($b_{i^tm^t} + F_p^{i^t}(T_{i^tm^t} - T_{i^t}^{DDL})$) when $T_{i^tm^t} \leq (>) T_{i^t}^{DDL}$, the satisfied $i^t$ ($m^t$) will be added to the candidate set $U_c^t$ ($M_c^t$). Based on all the above conditions, Algorithm 1 will eventually generate the candidate tasks set $U_c^t$ and the candidate mobile edge nodes set $M_c^t$.

Task Assignment

Given the candidate task set $U_c^t$ and mobile edge node set $M_c^t$, the pricing strategy may be complex and encompasses the following difficulties: 1) At each time slot, because more than one task participates in a bidding auction, it may not be possible to simply use a second-price strategy (a well-known pricing strategy for the single-item auction) [18]. 2) Other than the bids of each mobile edge node, the edge node also needs to consider profit maximization, which is also determined by the task completion time of each mobile edge node. Here, the profit of the static edge node for auctioning the task $i^t$ to $m^t$ is described by:

$$profit_{i^tm^t} = \begin{cases} v_{i^t} - p_{i^t}, & \text{if } T_{i^tm^t} \leq T_{i^t}^{DDL}, \\ v_{i^t} - p_{i^t} - F_p^{i^t}(T_{i^tm^t} - T_{i^t}^{DDL}), & \text{if } T_{i^tm^t} > T_{i^t}^{DDL}. \end{cases} \quad (3)$$

where $p_{i^t}$ is the price of task $i^t$, $v_{i^t}$ is the valuation of $i^t$ for the static edge node, and $v_{i^t}$ is assumed to be private. The profit of $m^t$ bidding for the task $i^t$ is calculated by:

$$profit_{m^ti^t} = \begin{cases} 0, & \text{if lose} \\ p_{i^t} - c_{i^tm^t}, & \text{if win} \end{cases} \quad (4)$$

where $c_{i^tm^t}$ is the cost of the mobile edge node processing task $i^t$. The profit usually reflects the minimum payment to the bidder for willingly bidding for the task, i.e., $b_{i^tm^t} \geq c_{i^tm^t}$. From the above observations, it may be difficult for the static edge node to realize profit maximization with a simple pricing strategy. 3) It may be assumed that each mobile edge node may provide multiple services at the same time, but cannot process multiple tasks for the same service at the same time. Although in practical EC systems, multiple tasks may be assigned to one service deployed on a mobile edge node with high computing capability. Specifically, in an EC system, it is common for an operator to assign multiple tasks to a node with high computing capability when the efficiency of this node is much higher than the other available mobile edge nodes with low computing capability. Still, it may be assumed that each mobile edge node cannot process multiple tasks for the same service at the same time to facilitate deployment of tasks on mobile edge nodes. The aforementioned difficulties impede assignment of tasks to mobile edge nodes with maximum profit. The problem may be converted to a maximum matching problem on a weighted bipartite graph (refer to Theorem 2).

Figure 3A:
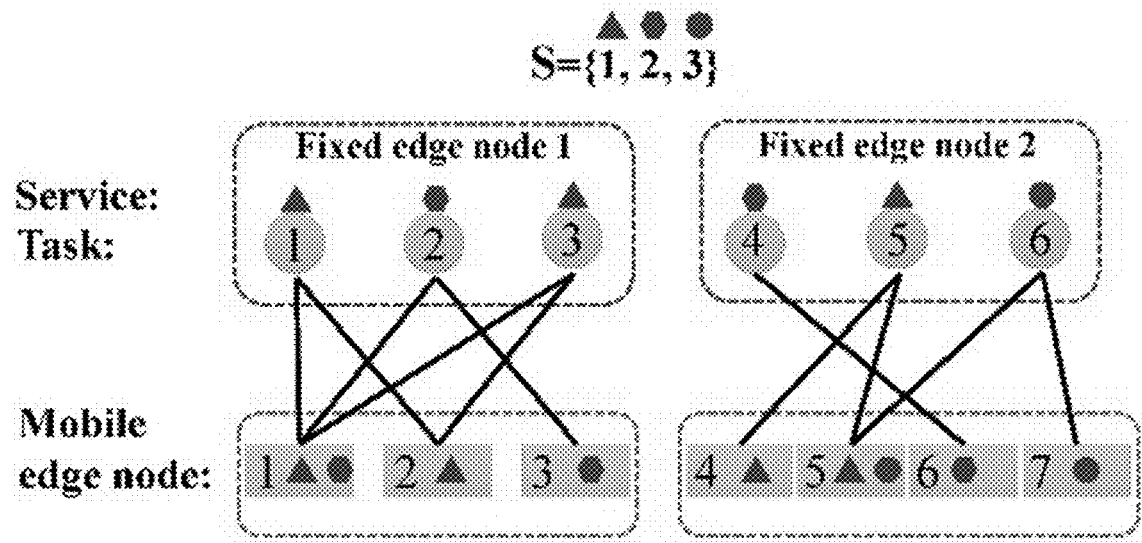
Figure 3B:
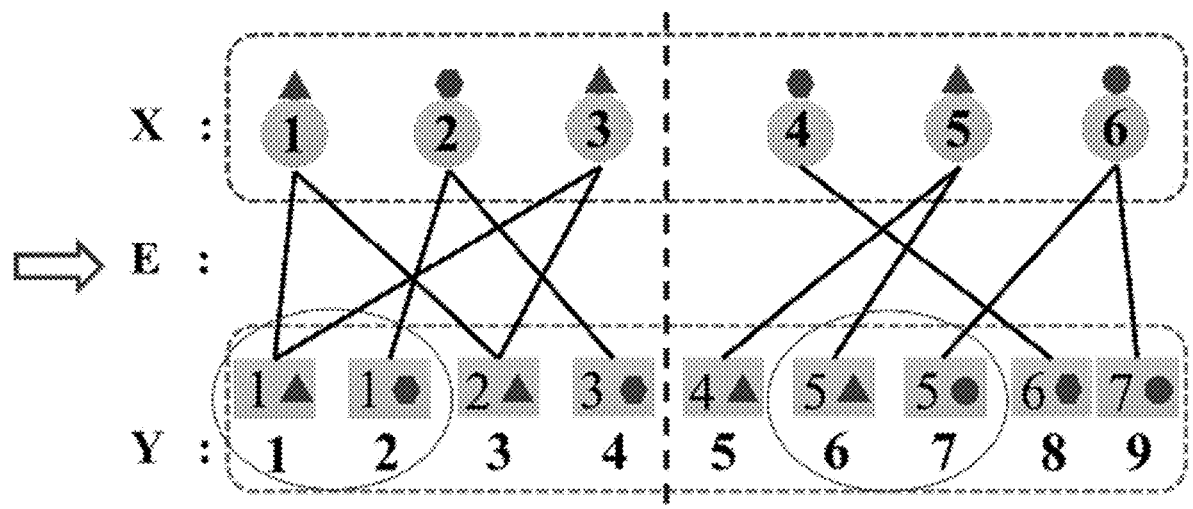

For example, without limitation, as shown in FIG. 3A, an EC environment is described including three kinds of services, two static edge nodes, six tasks and seven mobile edge nodes. Each task calls for a service, and it may be assumed that the mobile edge node with the requested service is a candidate mobile edge node. Since each mobile edge node cannot process multiple tasks for the same service at the same time, the bidder is defined as a specific mobile edge node with a specific service. For example, mobile edge node 1 in FIG. 3A with two kinds of embedded services may be represented as two bidders in FIG. 3B. Thus, in FIG. 3B, a weighted bipartite graph (X,Y,E) is constructed, where nodes set X denotes a tasks set, nodes set Y denotes a bidders set, and weighted links set E denotes the relationship between X and Y. A $profit_{i^tm^t}$ denotes the weight of each link. In this example, CRI aims to maximize the profit of the operator, i.e., the total profits of all static edge nodes. FIG. 3B clearly shows that each auction static edge node is independent as there exists no links between X and Y nodes. Therefore, profit maximization of the operator may be realized by maximizing the profit of each static edge node.

Graph construction: The weighted bipartite graph (X,Y,E) may be extended to a more general scenario, which corresponds to the mobile-assisted edge computing framework. Thus, in each time slot, X denotes $U_c^t$ and $y_{m^t_s} \in M_c^t \times S$ ($m^t \in M_c^t$, $s \in S$) denotes the element of Y. Furthermore, the link of E is used to denote whether the corresponding mobile edge node from Y is the candidate mobile edge node of the task from X. As seen in FIG. 3A and FIG. 3B, the original graph (X,Y,E) may be split into multiple subgraphs ($X^n$, $Y^n$, $E^n$), $n \in N$ and draw the following conclusion: subgraphs ($X^n$, $Y^n$, $E^n$), $n \in N$, are independent from each other and together form the original graph (X,Y,E).

To verify that the profit maximization problem of the operator is equal to the maximum matching (MM) problem of the weighted bipartite graph (X,Y,E), Definition 1 and Definition 2 are defined and Theorem 1 and Theorem 2 are proposed as follows:

Definition 1: [Complete matching] A matching in a graph is an independent set of links where no links share the same nodes. The value of a matching is the sum of weights of all the links in the matching. For a bipartite graph (X,Y,E) and its matching $E_m$, if $|X|=|E_m|$ or $|Y|=|E_m|$, then $E_m$ is a complete matching.

Definition 2: [Maximum matching] For a bipartite graph (X,Y,E), a maximum matching is the matching with the maximum value in the graph.

Theorem 1: The maximum profit of the operator is equal to the value of the MM problem of the corresponding bipartite graph (X,Y,E). One task will be assigned to one mobile edge node if the corresponding link is from the matching of the MM problem.

Proof: the value of the MM problem is finding the matching with the maximized value, and the value of each link in the matching corresponds to the profit of the operator. Thus, the maximum profit of the operator equals the value of the MM problem of the corresponding bipartite graph (X,Y,E). When the maximum matching is found, all the links of the maximum matching denote the assignment of the corresponding tasks, and Theorem 1 is proven.

Theorem 2: The MM problem of graph (X,Y,E) may be solved by solving the MM problems of all the subgraphs ($X^n$, $Y^n$, $E^n$), $n \in N$. And the value of the former matching equals to the sum of the latter matchings.

Proof: Because all the subgraphs of (X,Y,E) are independent from each other, the subgraphs generated by each auction node may be calculated separately. The sum of the MMs of the subgraphs equals the value of the MM of graph (X,Y,E), and Theorem 2 is proven.

Algorithm 2: CRI-TSD

```
Input:   U^t_c, M^t_c, B^t, S^t, profit_{i^t m^t}
Output:  U^t_w, M^t_w, P^t
1   Graph Construction:
2     Sort X nodes in order of U^t_c;
3     Sort Y nodes in order of M^t_c and S^t;
4     Construct E according to U^t_c × M^t_c and profit_{i^t m^t};
5     weight_{xy} ← profit_{i^t m^t};
6   Generate the weighted bipartite graph G = (X, Y, E) and divide
    it into subgraphs G^n = (X^n, Y^n, E^n) according to the static edge
    node, where G = {G^1, G^2, . . . , G^N};
7   MM Problem Solution (KM Algorithm):
8     foreach G^n, n ∈ N do
9       (1) Initialize the node labeling of X^n and Y^n;
10      (2) Searching for a complete matching with Hungarian algorithm [19];
11      (3) If no complete matching is found, modify the node labeling;
12      (4) Repeat (2) (3) until a complete matching of the equality subgraph is found;
13      Denote the MM as E^n_m;
14    end
15    P^t ← Σ_{n∈N} Σ_{X×Y∈E^n_m} weight_{xy};
16    Get U^t_w, M^t_w from E^n_m;
17    Return: U^t_w, M^t_w, P^t.
```

Based on Theorem 1 and Theorem 2, the profit maximization problem of the operator may be solved via a series of graph matching problems. the MM problem of single edge node may be calculated and a solution may be found in Algorithm 2. For profit$_{i^t m^t}$, it may be assumed that the pricing $p_{i^t}$ equals the bid $b_{i^t m^t}$ in the task assignment procedure. As shown in Algorithm 2, the procedure is divided into two steps: graph construction and MM problem solving. In the first step (refer to lines 1-6), the weighted bipartite graph G is constructed according to known variables $U_c^t$, $M_c^t$, $S^t$, and profit$_{i^t m^t}$. In the second step (refer to lines 7-14), the Kuhn-Munkres (KM) algorithm [20] may be used to find a MM on the bipartite graph G in time $O(\max\{|X|^3, |Y|^3\})$. $E_m^n$ is a subset of $E^n$ indicating the complete matching, and the MM may be found. $P^t$ in line 15 denotes the maximum profit of the operator in time slot t. Finally, $U_w^t$ ($M_w^t$) is obtained, which is the set of winner tasks (mobile edge nodes).

To use the KM algorithm, related concepts must be explored. For a weighted bipartite graph G=(X, Y, E) where the link (x, y)∈E has the weight$_{xy}$, if there exists a real-valued function $f$ on X∪Y such that we have $f(x)+f(y) \geq$ weight$_{xy}$, $\forall x \in X$, $y \in Y$, then $f$ is called a feasible node labeling for G. Given a bipartite graph G, a feasible node labeling may always be found. One node labeling is to set $f(x)=\max_{y \in Y}$ weight$_{xy}$, $\forall x \in X$, $f(y)=0$, $\forall y \in Y$. Given a feasible labeling $f$ in graph G, the link set may be denoted as $\{(x, y) | f(x)+f(y)=$weight$_{xy}$, $(x, y)\in E\}$ as $E_f$, where (X, Y) is called the feasible link. The graph $G_f=(X, Y, E_f)$ is the equality subgraph for G. The KM algorithm may be used to find a complete matching on the graph by gradually considering more links through elaborately adjusting the node labeling on the graph.

Thus, in Algorithm 2, a time complexity of $O(N^* \max\{|X^n|^3, |Y^n|^3\})$ is found for the second step, which is much better than $O(\max\{|X|^3, |Y|^3\})$ (i.e., the time to solve the graph G). The value of maximum profit may be calculated in line 15, and the winner tasks and mobile edge nodes may be found in line 16.

Tasks Processing & Paying

After the task assignment, the winner (i.e., a mobile edge node) will process the corresponding user requests and returns results to end users. It may now be desirable to ensure task completion by the mobile edge node. As shown in FIG. 2, in addition to generating candidate sets, mobile edge nodes need to submit a participation certificate, i.e., PoP (Proof of Participation), to static edge nodes. The PoP may be, for example, without limitation, an equipment identification number that may be used to identify and track unique mobile edge nodes. Then, if the mobile edge node that submits PoP and becomes the winner but does not complete the task, the reputation of the mobile edge node may be damaged and may even be subject to additional compensation and legal liability. If the mobile edge node does not complete the task within the guaranteed time, the edge node will be compensated. Thus, PoP may be used to ensure that mobile edge nodes behave honestly.

When all the winner tasks $U_w^t$ are processed, the static edge nodes should pay the winners $M_w^t$ for their workload. Next, non-repudiation may be ensured. PoA (Proof of Assignment) may be used, which is sent to the winner before task processing. The PoA may record the fact that the static edge node assigns a task to a mobile edge node, based on which, the static edge node must pay for the workload of the assigned mobile edge node after the task processing.

Figure 8:
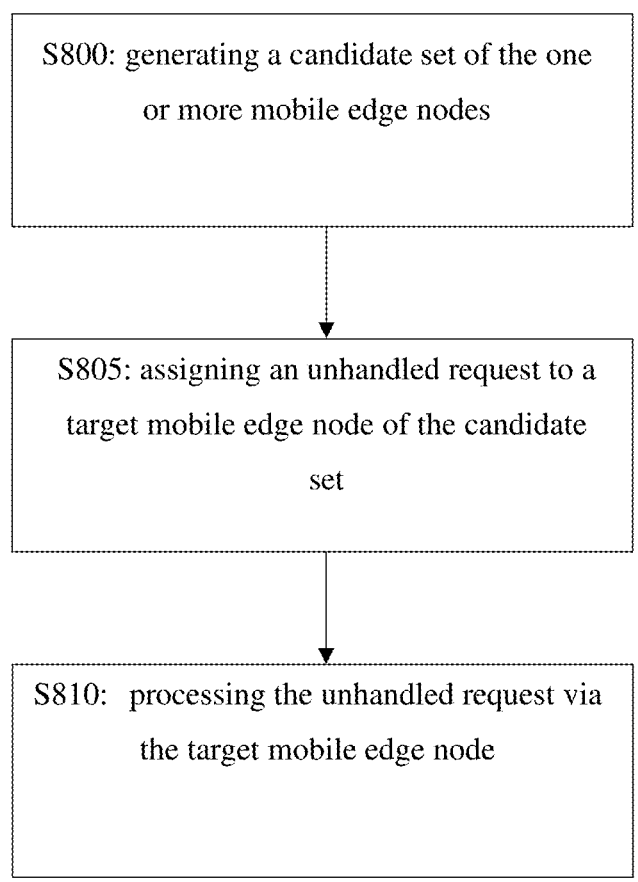
FIG. 8 illustrates an exemplary method for conducting a CRI auction mechanism, in accordance with an embodiment of the present disclosure.

FIG. 8 illustrates an exemplary method for conducting a CRI auction mechanism, in accordance with an embodiment of the present disclosure. Method 800 begins with a step S800, wherein a candidate set is generated from one or more mobile edge nodes. In a step S805, an unhandled request may be assigned to a target mobile edge node of the candidate set via a static edge node. In a step S810, the unhandled request may be processed by the target mobile edge node.

Analysis of CRI Design

Algorithm 3: CRI

```
Input:   U^t, M^t, S^t, B^t, V^t, profit_{i^t m^t}
Output:  U^t_w, M^t_w, P^t
1   (U^t_c, M^t_c) ← CRI – CSG(U^t, M^t, S^t, B^t, V^t);
2   (U^t_w, M^t_w, P^t) ← CRI –
    TSD(U^t_c, M^t_c, B^t, S^t, profit_{i^t m^t});
3   Return: U^t_w, M^t_w, P^t.
```

Algorithm Complexity

Combined with the details of the CRI design, the main function (refer to Algorithm 3) realizes the CRI design in each time slot. This algorithm includes the whole auction process, i.e. the candidate sets generation (with reference to Algorithm 1) and task assignment determination stages (with reference to Algorithm 2). Sorting the mobile edge nodes in $M_i^t$ in line 9 of Algorithm 1 takes $O(|M_i^t|\log(|M_i^t|))$ time, while the for-loop in line 10 has a time complexity of $O(|M_i^t|)$. Thus, the for-loop in line 6 has a time complexity of $O(U^t|M_i^t|(1+\log(|M_i^t|)))$. Therefore, Algorithm 1 takes $O(U^t|M_i^t|(1+\log(|M_i^t|)))$ time.

In Algorithm 2, the KM algorithm has a time complexity of $O(N^*\max\{|X^n|^3, |Y^n|^3\})$ (as described above). Sorting X nodes in line 2 takes $O(|U_c^t|\log(|U_c^t|))$ time, while sorting Y nodes in line 3 takes $O(|M_c^t \times S|\log(|M_c^t \times S|))$ time. Thus, Algorithm 2 has a time complexity of $O(N^*\max\{|X^n|^3, |Y^n|^3\}+|U_c^t|\log(|U_c^t|)+|M_c^t \times S|\log(|M_c^t \times S|))$.

Therefore, the overall time complexity of CRI in Algorithm 3 is $O(U^t|M_i^t|(1+\log(|M_i^t|))+N^*\max\{|X^n|^3, |Y^n|^3\}+|U_c^t|\log(|U_c^t|)+|M_c^t \times S|\log(|M_c^t \times S|))$. In other words, the CRI may converge to the final assignment and pricing result in polynomial time.

Desirable Properties

To analyze the proposed CRI auction mechanism, the desirable properties of the mechanism are described with the following theorems.

Theorem 3: The CRI satisfies individual rationality.

Proof: CRI satisfies individual rationality if and only if $\text{profit}_{i^t m^t} \geq 0$, $\text{profit}_{m^t i^t} \geq 0$, $\forall m^t \in M_c^t$, $i^t \in U_c^t$. Combining lines 11-22 of Algorithm 1 and $\text{profit}_{i^t m^t}$ in Equation (3), it must be profitable (i.e., $\text{profit}_{i^t m^t} \geq 0$) for the operator (or the static edge node) to auction the task $i^t$ when $p_{i^t} = b_{i^t m^t}$ in Algorithm 2. Thus, the profit of the auctioneer is nonnegative.

For the bidders (i.e., mobile edge nodes involved in the auction), $\text{profit}_{m^t i^t}$ in Equation (4) denotes the profit of each bidder. Additionally, $p_{i^t} = b_{i^t m^t} \geq c_{i^t m^t}$ always holds and the profit of the bidder is nonnegative. From the perspective of bidders/mobile edge nodes, in fact, the non-negative profit promotes the effective utilization of idle resources. Thus, the potential mobile edge nodes may be fully utilized.

The above two conclusions together prove that CRI satisfies individual rationality.

Theorem 4: The CRI guarantees truthfulness.

Proof: The present CRI design pursues profit maximization of the auctioneer, not the bidders. In this design, the bidders will decide their own bids $B^t$ so that bidders individually make a profit. However, due to sealed auction [21], bidders do not know each other's bids, computing power and other information. If taking this opportunity to inflate the price, it is likely that such bidders are excluded from the candidate set to reduce their own interests. Thus, bids may be reasonable. Based on $B^t$, to maximize the profit of the operator, each auctioneer (static edge node) decides the winning bidder to maximize the profit of the auctioneer with the KM algorithm. Since the pricing strategy is based on the bid of each bidder, the decision of the static edge node will not harm the profit of the bidder. From the above reasoning, both the auctioneer and the bidder of the auction must be truthful in order to maximize their own interests.

Theorem 5: The CRI satisfies profit maximization.

Proof: From the proof of Theorem 3, the profit maximization of the static edge node may be realized only when we let $p_{i^t} = b_{i^t m^t}$ in Equation (4). If $p_{i^t} > b_{i^t m^t}$, it will harm the profit of the auctioneer, which should be avoided. If $p_{i^t} < b_{i^t m^t}$, it will reduce the credibility of the auctioneer in terms of the existence of PoA, which will ultimately reduce the long-term benefits. Therefore, the profit maximization is guaranteed in the CRI design.

Together with the computational efficiency, the above economic properties ensure the feasibility of the CRI design. Feasibility is also guaranteed with the aforementioned simulation results from the experimental point of view.

Performance Evaluation

Experimental Settings

Network construction: The evaluation of the CRI design sets no presumption on the demands of extra user requests, the valuations of tasks, and the bids of mobile edge nodes. Thus, numerical results are valid for any possible data sets. Because there are no existing statistics on the valuations of user requests and the costs of mobile edge nodes for processing tasks in the real EC environment, for generality, the valuations of user requests and the corresponding bids of each task are randomly generated, both of which follow the uniform distribution within (0,1].

Figure 4A:
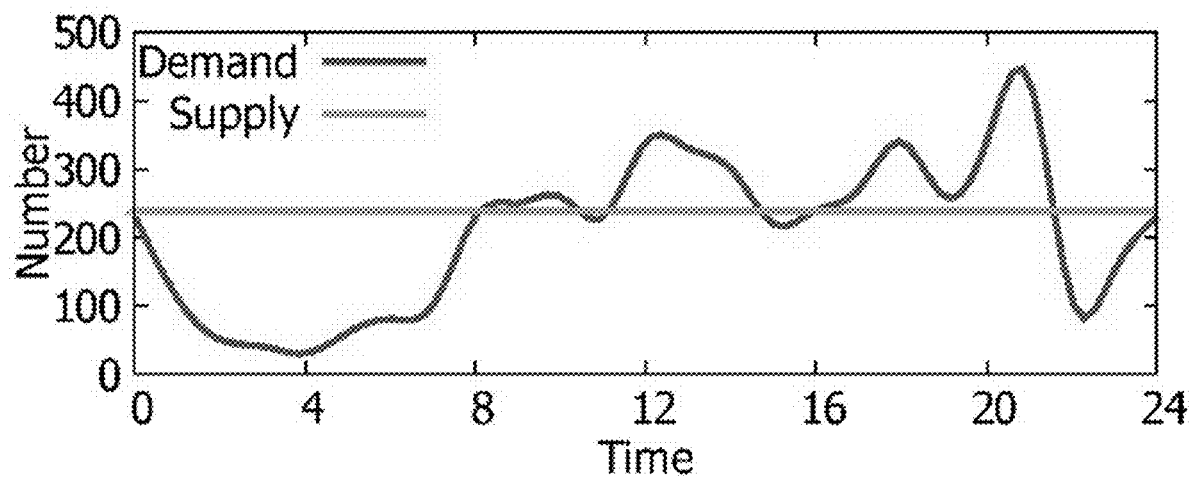

The parameter $\alpha$ is the ratio of candidate tasks to all the user requests generated in the EC environment. Additionally, $\alpha$ reflects the resource shortage of static edge nodes, where a larger value of $\alpha$, indicates a scarcer amount of resources. The $\alpha$ parameter may be used to randomly generate the candidate tasks set. A $\beta$ parameter is the ratio of candidate mobile edge nodes to all the covered mobile edge nodes. $\beta$ may be used to reflect the emergency capability. The larger the value of $\beta$, the stronger the emergency capability is. Both $\alpha$ and $\beta$ change dynamically with time, and the EC environment may be generated where $\alpha$ and $\beta$ are close to synchronization, and thus supply and demand are effectively balanced. For the experiment setup, the supply-demand mismatch situation in FIG. 4A may be simulated. As shown, the demand of user requests is simulated using datasets for Chengdu taxi users from Didi Chuxing GAIA Initiative [22], which reflects real demands over time, and the supply index may be set (e.g., the processing capacity of static edge nodes). As seen in FIG. 4A, it may be found that supply-demand mismatch is significant as the resources of static edge nodes are over-provisioned during certain periods of the day (i.e. between 0 to 8 o'clock) while the resources are in short supply during certain periods (i.e. between 18 to 21 o'clock). Then, the ratio between $\alpha$ and $\beta$ is as follows:

$$\alpha = \max\{(\text{Demand} - \text{Supply})/\text{Supply}, 0\} \quad (5)$$

$$\beta = \max\{(\text{Demand} - \text{Supply})/\text{Supply} + \sigma, 0\} \quad (6)$$

Figure 4B:
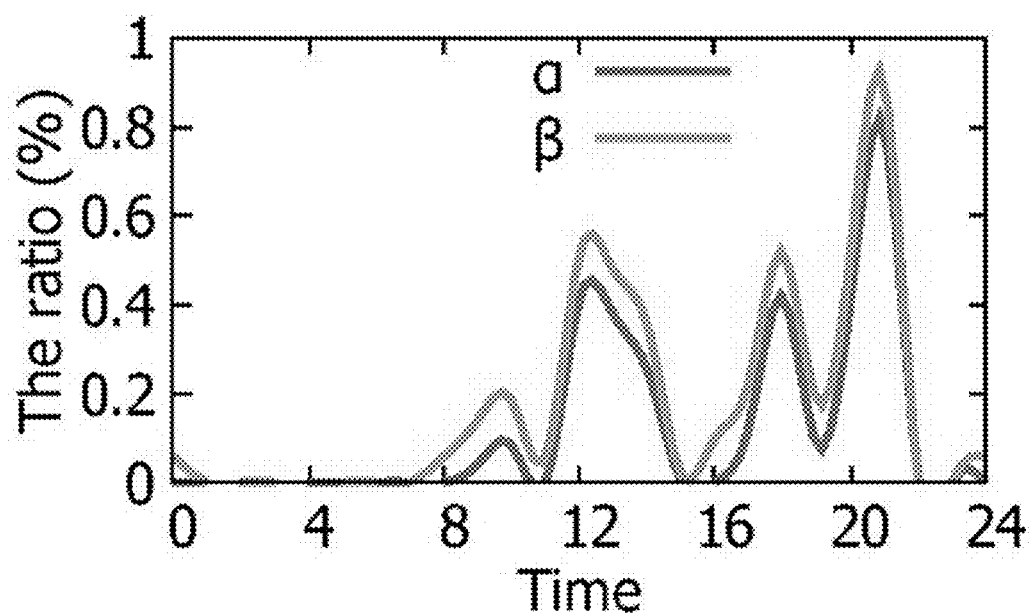

FIG. 4B shows that the value of $\beta$ changes with the value of $\alpha$, and the value of $\sigma$ may be set according to uniform distributions within [0,0.1].

| Algorithm 4: GA |
| --- |
| Input: $U_c^t$ $M_c^t$ $B^t$ $S^t$ $\text{profit}_{i^t m^t}$ |
| Output: $U_w^t$ $M_w^t$ $P^t$ |
| 1      $(U_c^t, M_c^t) \leftarrow$ CRI – CSG($U^t, M^t, S^t, B^t, V^t$); |
| 2      Lines 1-6 of CRI-TSD; |
| 3      Greedy Assignment Algorithm: |
| 4      foreach $G^n$, $n \in N$ do |
| 5          (1) Initialize the node labeling of $X^n$ and $Y^n$; |
| 6          (2) Searching for the link with the maximized profit and remove the links related to the corresponding nodes; |
| 7          (3) Continue searching for the remaining links, and repeat step (2) until there exists no link in the subgraph; |
| 8          (4) Record all the links searched in (2) (3) steps; |
| 9          Denote the match as $E^n_{greedy}$; |
| 14     end |
|        greedy weight; |
| 15     $P^t \leftarrow \Sigma_{n \in N} \Sigma_{X \times Y \in E^n_{greedy}} \text{weight}_{xy}$; |
| 16     Get $U_w^t, M_w^t$ from $E^n_{greedy}$; |
| 17     Return: $U_w^t, M_w^t, P^t$. |

Comparison algorithms: To demonstrate the performance of the CRI algorithm, comparison is made with two benchmarks: (i) Greedy assignment (GA): This algorithm uses the greedy assignment algorithm (refer to lines 4-10 of Algorithm 4) to replace the KM algorithm of Algorithm 3. $E_{greedy}^n$ in line 9 is a subset of $E^n$ indicating the match searched by the greedy algorithm. The time complexity of the greedy assignment algorithm is $O(N^*|X^n \times Y^n|^2 \log_2 |X^n \times Y^n|)$. (ii) All up to clouds (AC): AC aims to respond to all the user requests with the capacity of static edge nodes and the remote cloud, which has been studied in many works [6][23]. In this case, although the operator will not pay the mobile edge nodes, AC will still results in a loss of economic profit due to the lower task completion rate.

Algorithm Performance

Figure 5A:
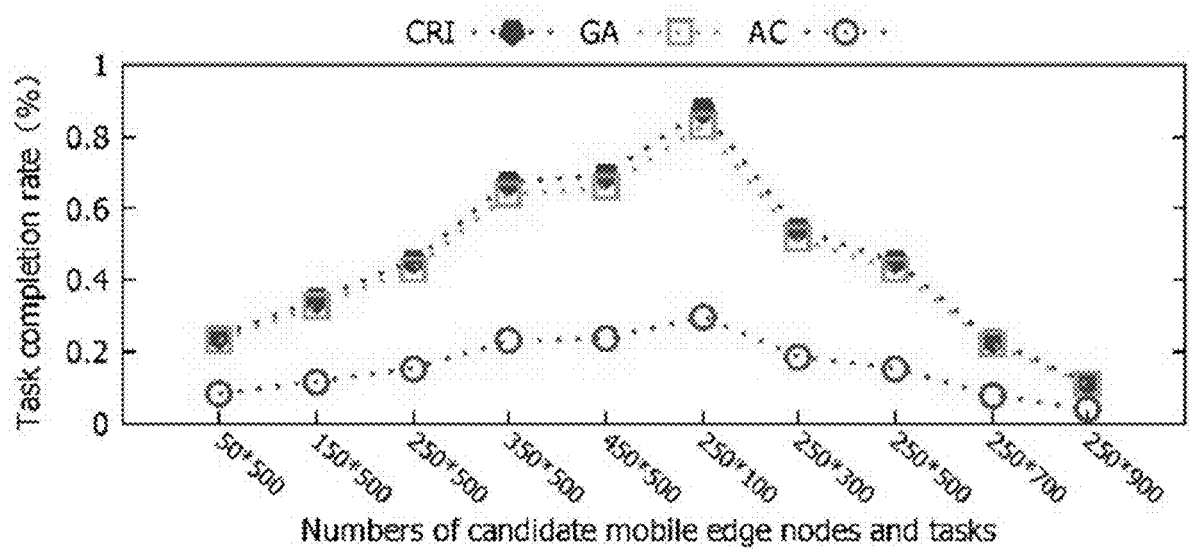

To show the performance of CRI, comparison was made between two benchmarks (i.e., GA and AC). Rigorously analysis was performed for three metrics with generous evaluations as follows:

Task completion rate (TCR): FIG. 5A shows the average task completion rates of benchmarks and CRI with different numbers of candidate mobile edge nodes and tasks. For example, 350*500 in FIG. 5A refers to a random generation of 350 candidate mobile edge nodes and 500 candidate tasks. The task completion rate of the Y-axis denotes the completion rate of candidate tasks. As shown, the TCR of CRI and GA is much higher than the TCR of AC, which proves that the introduction of the auction mechanism in the EC environment may significantly improve the TCR. Meanwhile, the TCR of CRI is slightly higher than the TCR of GA, where the KM algorithm of CRI is searching for a complete matching of the equality subgraph and the greedy assignment algorithm of GA may not search for a similar matching. The TCR tends to rise with the increase of candidate mobile edge nodes and decrease with the increase of candidate tasks. Thus, more candidate mobile edge nodes (and fewer candidate tasks) results in a higher TCR. CRI design significantly improves the QoS of the operator.

Figure 5B:
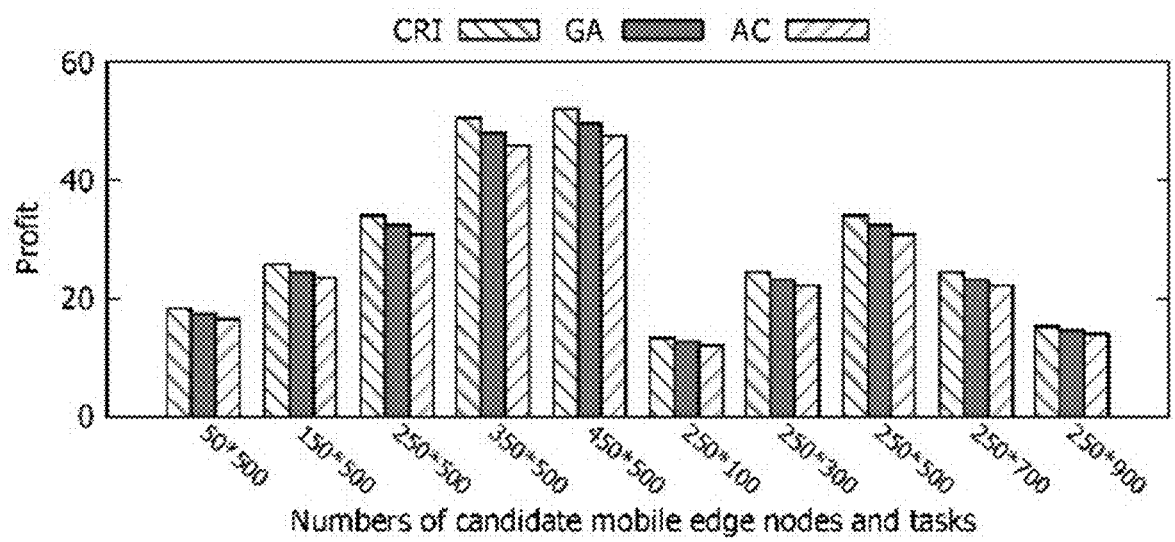

Profit: FIG. 5B indicates the average profit the operator may gain by changing numbers of candidate mobile edge nodes and tasks. The results show that the profit of CRI is higher than the profit of GA and AC. The profit of CRI is higher than GA because the KM algorithm of CRI utilizes maximum matching while the greedy algorithm of GA may not obtain an optimal solution. The profit of CRI is higher than AC as although each completed task is more profitable, the total profit will decrease due to the decrease of the TCR. Therefore, the profit of the CRI design is an improvement compared to GA and AC. Furthermore, all the profits in FIG. 5B rise with the increase of candidate mobile edge nodes due to a synchronous rise in TCR. However, with the increase of the number of candidate tasks, profits increase first and then decrease. This may be because TCR is declining, but the base number of candidate tasks is rising. Thus, we conclude that CRI design is economically beneficial to the operator.

TABLE 2

Elapsed time of CRI (N = 10)

| $|U^t_c| = 500$ | $|M^t_c|$ | 50 | 150 | 250 | 350 | 450 |
|---|---|---|---|---|---|---|
|  | Time(ms) | 0.323 | 1.243 | 13.358 | 32.564 | 45.637 |
| $|M^t_c| = 250$ | $|U^t_c|$ | 100 | 300 | 500 | 700 | 900 |
|  | Time(ms) | 0.753 | 1.425 | 13.363 | 23.527 | 54.318 |

TABLE 3

Elapsed time of GA (N = 10)

| $|U^t_c| = 500$ | $|M^t_c|$ | 50 | 150 | 250 | 350 | 450 |
|---|---|---|---|---|---|---|
|  | Time(ms) | 0.412 | 1.431 | 13.675 | 32.335 | 46.582 |
| $|M^t_c| = 250$ | $|U^t_c|$ | 100 | 300 | 500 | 700 | 900 |
|  | Time(ms) | 0.812 | 1.324 | 12.675 | 24.329 | 61.237 |

Computational efficiency: To confirm the analysis of time complexity described above, the elapsed time of CRI with different settings is shown in Table 1. For each setting, 50 instances are randomly generated and the results are averaged. The tests were conducted using Python 3.6 with an Intel® Core™ i7-8750H processor, 16 GB memory processor. It was verified that Algorithm 3 for CRI converges to a polynomial time with respect to $|M_c^r|$ and $|U_c^r|$, the candidate tasks set and mobile edge nodes set, respectively. Table 2 shows the average elapsed time of GA. The results show us that both CRI and GA are computationally efficient and GA is not an improvement over CRI. As for AC, although it costs no time for the auction procedure, there are costs in other metrics.

Overall, compared with the other two benchmarks, the CRI algorithm has better performance in the above three metrics. These metrics reflect the advantages of CRI design from the aspects of service quality, economic benefits and computational efficiency. Consequently, applying CRI to mobile-assisted edge computing framework may improve the QoS of static edge nodes by obtaining higher TCR and gain more profit efficiently.

Economic Properties

Figure 6A:
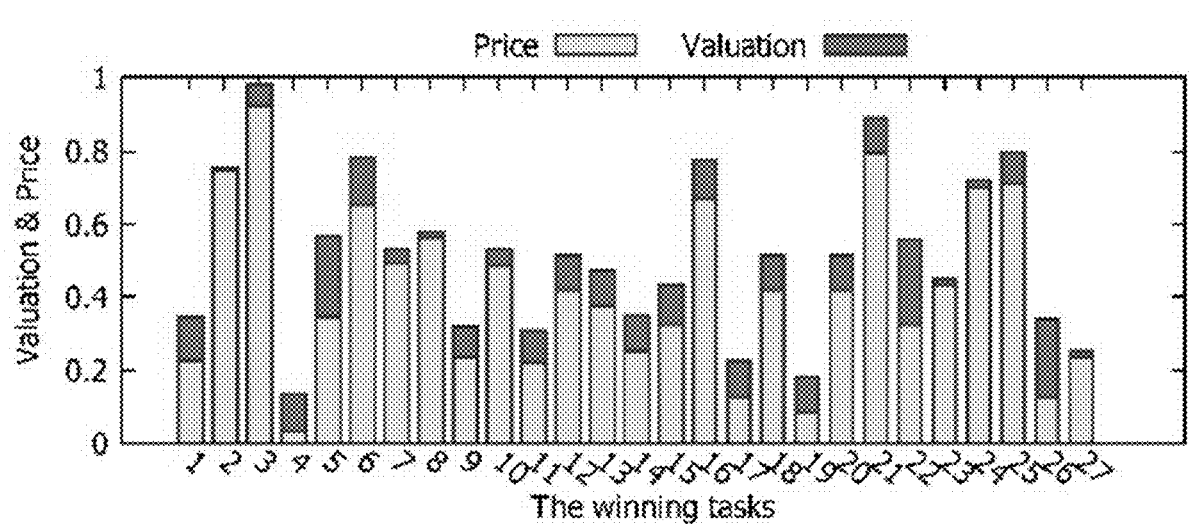
Figure 6B:
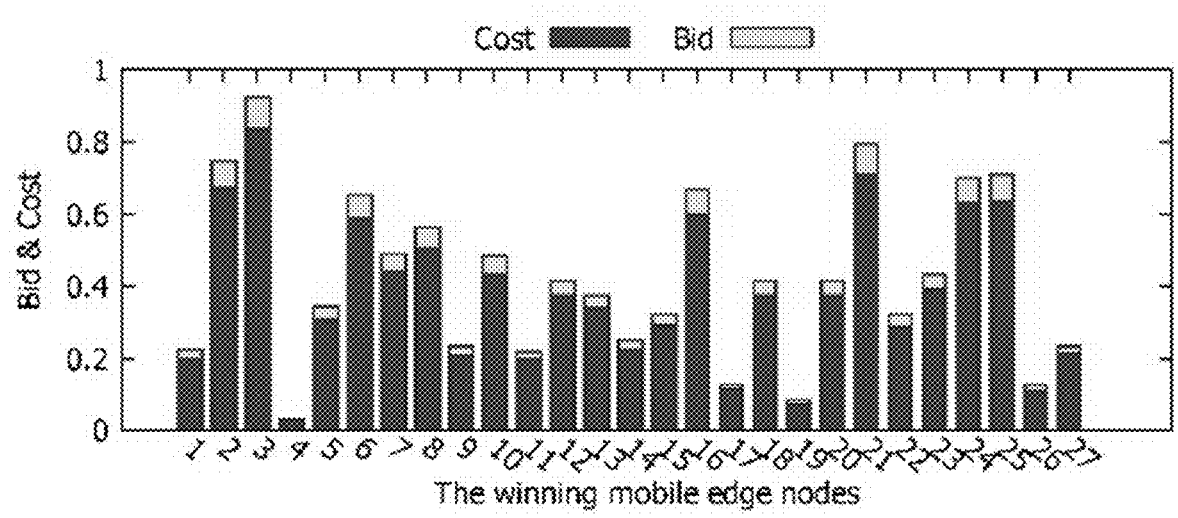

Individual rationality: Theorem 3 proves that CRI is individually rational, meaning that each winning task has a higher valuation than the charged price (as shown in FIG. 6A), while each winning mobile edge node receives a payment greater than the cost for processing the corresponding task (as shown in FIG. 6B). The valuations and prices of winning tasks are shown in FIG. 6A, and the bids and costs of winning mobile edge nodes is shown in FIG. 6B. As shown, the winning mobile edge nodes obtain positive utilities (i.e., benefit from CRI). The operator still makes a profit since the utility of each winning task is positive. Thus, the mobile edge nodes are willing to support the static edge nodes and the operator may auction tasks that cannot be processed by static edge nodes.

Figure 7A:
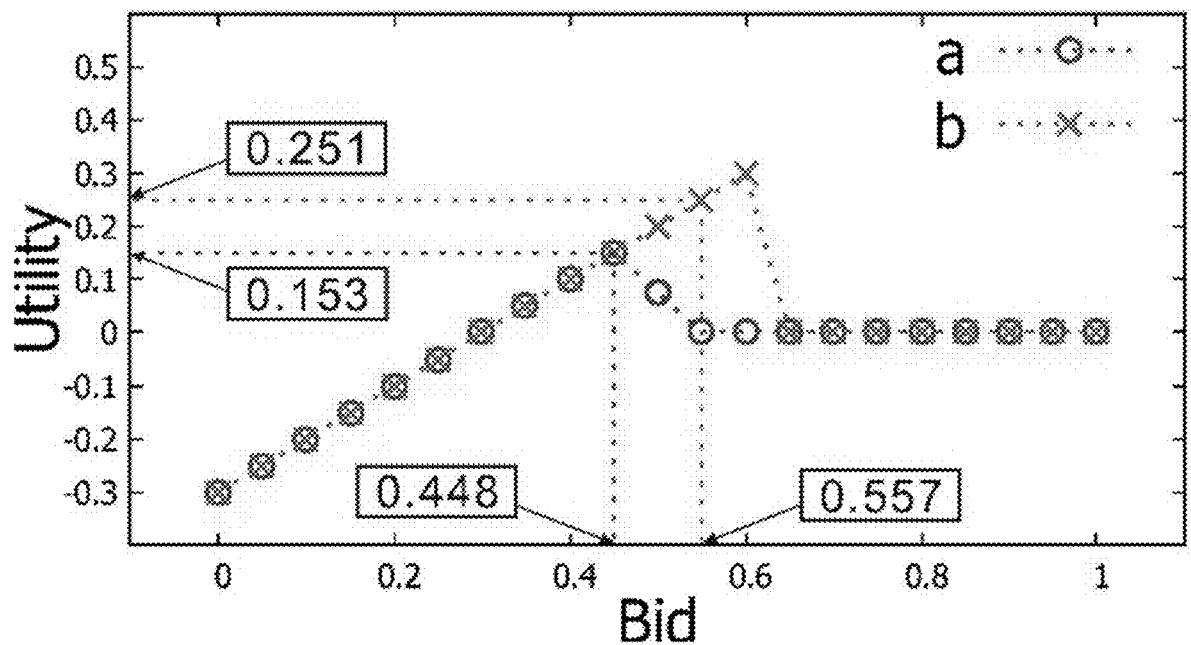

Truthfulness: To validate the truthfulness of CRI in Theorem 4, a mobile edge node I selected to examine utility change when the mobile edge node bids different values. As shown in FIG. 7A, a represents a situation in which the mobile edge node is a winner when its bid is 0.448 and the cost is 0.295. Thus, the mobile edge node gains the utility/profit 0.153. Then, the bid of the mobile edge node is changed to retest. The results show that the mobile edge node still wins the auction when the bid is smaller than 0.448, but loses the auction when the bid is more than 0.448. It may be seen that the mobile edge node cannot improve its utility by changing the bid. However, from testing all the mobile edge nodes, very few cases similar to b where the mobile edge node, which is a winner when its bid is 0.557 and the cost is 0.306, may still improve its utility by improving bids. It is emphasized that although all the mobile edge nodes may flexibly adjust bids, there is also an elevated risk of bidding failure, and the failure rate tested by the experiment is up to 97.87%. Therefore, a rational mobile edge node is incentivized to be truthful. Furthermore, the truthfulness of the edge node may be examined in two cases: 1) if the price is lower than the bid of the winner, it will undesirably harm the credit of the static edge node; 2) if the price is higher than the bid of the winner, it will harm the profit of the static edge node. In summary, CRI may guarantee the truthfulness for both mobile edge nodes and static edge nodes since the utility cannot be improved by untruthful behaviors. Thus, CRI may be freed from the interference of untruthful participants (static edge nodes and mobile edge nodes) that try to benefit themselves at the expense of others.

Figure 7B:
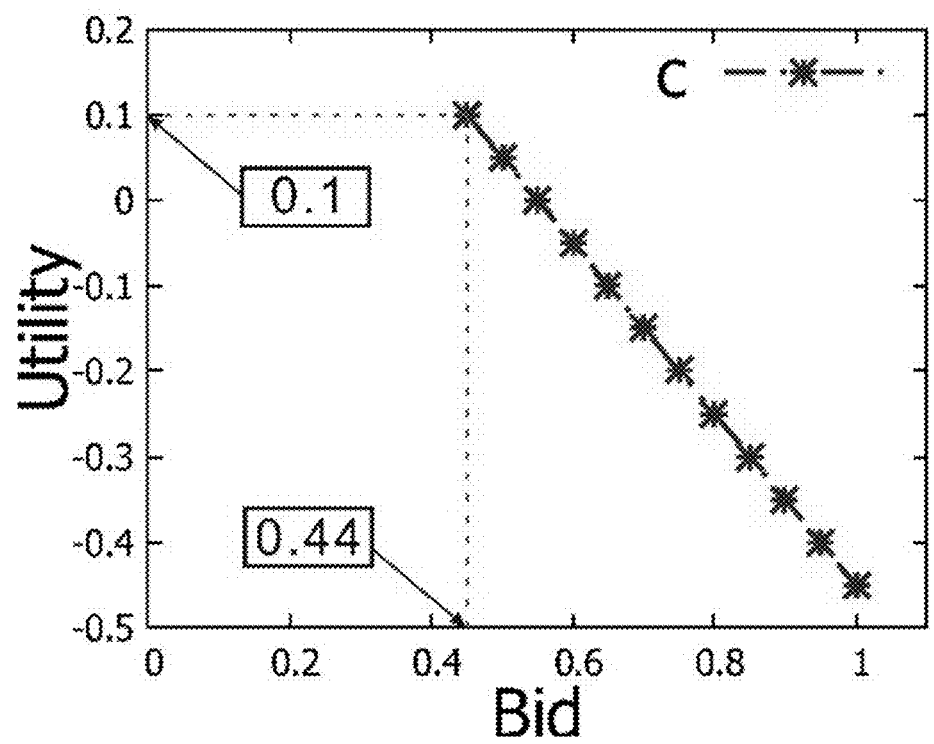

Profit maximization: To verify the profit maximization of Theorem 5, case c is shown in FIG. 7B, where the winning bid is 0.44, and the valuation of winner task is 0.55. If price<0.44, it will harm the credit of static edge node (refer to Theorem 4), which is to be avoided. If price≥0.44, the static edge node cannot benefit more from the task (refer to Equation (3)). Thus, the CRI ensures the maximized profit the static edge node may gain from each winner task.

Through the above simulation experiments, the consistency between the experimental results and the theoretical proofs are proven.

Beyond the Present: Potential Long-Term Profit

From the results of the simulation experiments, the CRI design is conducive to improving the task completion rate, and further improves the user experience for emerging IoT applications, attracting more users to send requests to the EC environment.

CONCLUSION

Although EC aims to provide an "anywhere, anytime" low-latency service for end users, the limited resources of static edge nodes and the sudden peak demand challenge are existing solutions. These challenges are characterized as the supply-demand mismatch problem at the network edge. The mobile-assisted edge computing framework is described herein by introducing mobile edge nodes to improve the QoS of static edge nodes. Additionally, CRI may be used to stimulate mobile edge nodes for mitigating the supply-demand mismatch. CRI has been proven with desirable properties, including individual rationality, truthfulness and profit maximization, and numerical results show the advantages of the mobile-assisted edge computing framework.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible considering the said teachings or may be acquired from practicing the disclosed embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the said-described embodiments, but instead is defined by the appended claims considering their full scope of equivalents.

REFERENCE LIST

[1] D. Wu, H. Shi, H. Wang, R. Wang, and H. Fang, "A feature-based learning system for internet of things applications," IEEE Internet Things J., vol. 6, no. 2, pp. 1928-1937, 2019.

[2] J. Ren, D. Zhang, S. He, Y. Zhang, and T. Li, "A survey on end-edge-cloud orchestrated network computing paradigms: Transparent computing, mobile edge computing, fog computing, and cloudlet," ACM Comput. Surv., vol. 52, no. 6, pp. 125:1-125:36, 2020.

[3] L. Chen and J. Xu, "Budget-constrained edge service provisioning with demand estimation via bandit learning," IEEE Journal on Selected Areas in Communications, vol. 37, no. 10, pp. 2364-2376, 2019.

[4] Y. Zhang, L. Jiao, J. Yan, and X. Lin, "Dynamic service placement for virtual reality group gaming on mobile edge cloudlets," IEEE Journal on Selected Areas in Communications, vol. 37, no. 8, pp. 1881-1897, 2019.

[5] L. Pu, X. Chen, J. Xu, and X. Fu, "D2D fogging: An energy-efficient and incentive-aware task offloading framework via network-assisted D2D collaboration," IEEE Journal on Selected Areas in Communications, vol. 34, no. 12, pp. 3887-3901, 2016.

[6] T. He, H. Khamfroush, S. Wang, T. L. Porta, and S. Stein, "It's hard to share: Joint service placement and request scheduling in edge clouds with sharable and non-sharable resources," in Proc. of IEEE ICDCS, Vienna, Austria, 2018, pp. 365-375.

[7] V. Farhadi, F. Mehmeti, T. He, T. L. Porta, H. Khamfroush, S. Wang, and K. S. Chan, "Service placement and request scheduling for data-intensive applications in edge clouds," in Proc. of IEEE INFOCOM, Paris, France, 2019, pp. 1279-1287.

[8] I. D. Zyrianoff, A. Heideker, D. Silva, J. H. Kleinschmidt, J. Soininen, T. S. Cinotti, and C. Kamienski, "Architecting and deploying iot smart applications: A performance oriented approach," Sensors, vol. 20, no. 1, p. 84, 2020.

[9] S. Zhu, L. Gui, N. Cheng, F. Sun, and Q. Zhang, "Joint design of access point selection and path planning for uav-assisted cellular networks," IEEE Internet of Things Journal, vol. 7, no. 1, pp. 220-233, 2020.

[10] S. Wan, Z. Gu, and Q. Ni, "Cognitive computing and wireless communications on the edge for healthcare service robots," Computer Communications, vol. 149, pp. 99-106, 2020.

[11] Y. Zhang, C. Li, T. H. Luan, Y. Fu, W. Shi, and L. Zhu, "A mobility-aware vehicular caching scheme in content centric networks: Model and optimization," IEEE Trans. Vehicular Technology, vol. 68, no. 4, pp. 3100-3112, 2019.

[12] Y. Wang, S. Liu, X. Wu, and W. Shi, "Cavbench: A benchmark suite for connected and autonomous vehicles," in Proc. of IEEE/ACM SEC, Seattle, Wash., USA, 2018, pp. 30-42.

[13] Q. Zhang, Y. Wang, X. Zhang, L. Liu, X. Wu, W. Shi, and H. Zhong, "Openvdap: An open vehicular data analytics platform for cavs," in Proc. of IEEE ICDCS, Vienna, Austria, 2018, pp. 1310-1320.

[14] A. Ahmed and G. Pierre, "Docker container deployment in fog computing infrastructures," in Proc. of IEEE EDGE, San Francisco, Calif., USA, 2018, pp. 1-8.

[15] T. V. Doan, G. T. Nguyen, H. Salah, S. Pandi, M. Jarschel, R. Pries, and F. H. P. Fitzek, "Containers vs virtual machines: Choosing the right virtualization technology for mobile edge cloud," in Proc. of IEEE 5G World Forum, Dresden, Germany, 2019, pp. 46-52.

[16] J. Lyu, Y. Zeng, R. Zhang, and T. J. Lim, "Placement optimization of uav-mounted mobile base stations," IEEE Communications Letters, vol. 21, no. 3, pp. 604-607, 2017.

[17] J. Cao, L. Yang, and J. Cao, "Revisiting computation partitioning in future 5g-based edge computing environments," IEEE Internet of Things Journal, vol. 6, no. 2, pp. 2427-2438, 2019.

[18] Y. Zhang, Q. Yang, W. Yu, D. An, D. Li, and W. Zhao, "An online continuous progressive second price auction for electric vehicle charging," IEEE Internet of Things Journal, vol. 6, no. 2, pp. 2907-2921, 2019.

[19] B. Cao, J. Wang, J. Fan, J. Yin, and T. Dong, "Querying similar process models based on the hungarian algorithm," IEEE Trans. Serv. Comput., vol. 10, no. 1, pp. 121-135, 2017.

[20] H. Zhu, D. Liu, S. Zhang, Y. Zhu, L. Teng, and S. Teng, "Solving the many to many assignment problem by improving the kuhn-munkres algorithm with backtracking," Theor. Comput. Sci., vol. 618, pp. 30-41, 2016.

[21] R. Alvarez and M. Nojoumian, "Comprehensive survey on privacy-preserving protocols for sealed-bid auctions," Computers & Security, vol. 88, 2020.

[22] Didi Chuxing GAIA Initiative. [Online]. Available: https://outreach.didichuxing.com/research/opendata/.

[23] Y. Chen, Y. Zhang, and X. Chen, "Dynamic service request scheduling for mobile edge computing systems," Wireless Communications and Mobile Computing, vol. 2018, pp. 1 324 897:1-1 324 897:10, 2018.

What is claimed is:

1. A Mobile-Assisted edge computing framework, comprising:
   one or more requests to be processed;
   a static edge node comprising an access point (AP) and an edge server;
   one or more mobile edge nodes;
   an operator configured to assign the one or more requests to the static edge node; and
   a cloud configured to cache and pre-fetch services for the one or more requests;
   wherein the one or more requests comprise handled requests and unhandled requests,
      the static edge node is configured to process the handled requests,
      the unhandled requests comprise requests unable to be processed by the static edge node,
      the one or more mobile edge nodes are configured to process the unhandled requests, and
      the static edge node is configured to auction the unhandled requests to the one or more mobile edge nodes, the auction comprising:
         generating a candidate set of the one or more mobile edge nodes;
         assigning an unhandled request to a target mobile edge node of the candidate set; and
         processing the unhandled request via the target mobile edge node;
      wherein the generating comprises:
         selecting a subset of requests to be processed at a time slot from the one or more requests;
         receiving bids for the subset from the one or more mobile edge nodes;
         comparing a remote cloud task completion time and a mobile edge node task completion time; and
         generating the candidate set based on the bids and the comparing.

2. The framework of claim 1, wherein the bids are calculated by the one or more mobile edge nodes according to the mobile edge node task completion time, and the mobile edge node task completion time is calculated according to:

$$T_{i^t m^t} = I_{i^t} / D_{i^t n_{i^t}} + I_{i^t} / D_{n_{i^t} m^t} + K_{i^t} / c_{m^t} + O_{i^t} / D_{m^t n_{i^t}} + O_{i^t} / D_{n_{i^t} i^t}$$

wherein $T_{i^t m^t}$ is the mobile edge node task completion time, $i^t$ denotes the unhandled request of a corresponding end user, $m^t$ denotes a mobile edge node, $I_{i^t}$ is an input data size of the unhandled request, $K_{i^t}$ is an amount of required computational resources required for the unhandled request, $O_{i^t}$ is an output data size of the unhandled request, $c_{m^t}$ is an available processing capacity of the mobile edge node, $$D_{i^t n_{i^t}}$$

is a user-to-edge transmission rate, and $$D_{n_{i^t} m^t}$$

is an edge-to-mobile edge node transmission rate.

3. The framework of claim 2, wherein $$I_{i^t} / D_{i^t n_{i^t}} + I_{i^t} / D_{n_{i^t} m^t}$$

is a task uploading time, $K_{i^t}/c_{m^t}$ is a task processing time, and $$O_{i^t} / D_{m^t n_{i^t}} + O_{i^t} / D_{n_{i^t} i^t}$$

is a task downloading time.

4. The framework of claim 3, wherein the assigning comprises:
   constructing a weighted bipartite graph G comprising subgraphs $G^n$ according to the static edge node, where $G=\{G^1, G^2, \ldots, G^N\}$ and N is the number of subgraphs; and
   solving a Maximum Matching (MM) problem using the weighted bipartite graph.

5. The framework of claim 4, wherein the weighted bipartite graph is constructed according to a set of the one or more user requests, the candidate set, and a profit of the static edge node.

6. The framework of claim 5, wherein the profit of the static edge node is calculated according to:

$$profit_{i^t m^t} = \begin{cases} v_{i^t} - p_{i^t}, & \text{if } T_{i^t m^t} \leq T_{i^t}^{DDL}, \\ v_{i^t} - p_{i^t} - F_p^{i^t}(T_{i^t m^t} - T_{i^t}^{DDL}), & \text{if } T_{i^t m^t} > T_{i^t}^{DDL}. \end{cases}$$

where $profit_{i^t m^t}$ is the profit of the static edge node, $v_{i^t}$ is a valuation of the unhandled request for the static edge node, $p_{i^t}$ is a price of the unhandled request, $T_{i^t}^{DDL}$ is a deadline of task completion time, and $F_p^{i^t}$ is a penalty function.

7. The framework of claim 5, where the MM problem is solved using a Kuhn-Munkres (KM) algorithm.

8. The framework of claim 7, wherein after the processing, the target mobile edge node is configured to submit a Proof of Participation (PoP) to the static edge node, wherein the PoP comprises an equipment identification number used to identify and track unique mobile edge nodes.

9. The framework of claim 8, wherein when the target mobile edge node submits the PoP but does not complete the unhandled request, a reputation of the target mobile edge node is damaged.

10. The framework of claim 8, wherein when the target mobile edge node does not complete the unhandled request within a guaranteed time, the target mobile edge node is not compensated.

11. The framework of claim 8, wherein Proof of Assignment (PoA) is sent to the target mobile edge node before the processing and the target edge node is compensated for the processing by the static edge node based on the PoA.

12. The framework of claim 1, wherein each mobile edge node of the one or more mobile edge nodes is a smart car, unmanned aerial vehicle (UAV) or robot.

13. A method for processing one or more requests using a Mobile-Assisted computing framework comprising the following steps:
   generating a candidate set of one or more mobile edge nodes;

assigning an unhandled request to a target mobile edge node of the candidate set; and processing the unhandled request via the target mobile edge node;

wherein the Mobile-Assisted computing framework comprises:

one or more requests to be processed;

a static edge node comprising an access point (AP) and an edge server;

one or more mobile edge nodes;

an operator configured to assign the one or more requests to the static edge node; and a cloud configured to cache and pre-fetch services for the one or more requests;

wherein the one or more requests comprise handled requests and unhandled requests, the static edge node is configured to process the handled requests, the unhandled requests comprise requests unable to be processed by the static edge node, and the one or more mobile edge nodes are configured to process the unhandled requests; and the static edge node is configured to auction the unhandled requests to the one or more mobile edge nodes; and wherein the generating comprises:

selecting a subset of requests to be processed at a time slot from the one or more requests;

receiving bids for the subset from the one or more mobile edge nodes;

comparing a remote cloud task completion time and a mobile edge node task completion time; and generating the candidate set based on the bids and the comparing.

14. The method of claim 13, wherein the bids are calculated by the one or more mobile edge nodes according to the mobile edge node task completion time, and the mobile edge node task completion time is calculated according to:

$$T_{i^t m^t} = I_{i^t}/D_{i^t n_{i^t}} + I_{i^t}/D_{n_{i^t} m^t} + K_{i^t}/c_{m^t} + O_{i^t}/D_{m^t n_{i^t}} + O_{i^t}/D_{n_{i^t} i^t}$$

wherein $T_{i^t m^t}$ is the mobile edge node task completion time, $i^t$ denotes the unhandled request of a corresponding end user, $m^t$ denotes a mobile edge node, $I_{i^t}$ is an input data size of the unhandled request, $K_{i^t}$ is an amount of required computational resources required for the unhandled request, $O_{i^t}$ is an output data size of the unhandled request, $c_{m^t}$ is an available processing capacity of the mobile edge node, $$D_{i^t n_{i^t}}$$

is a user-to-edge transmission rate, and $$D_{n_{i^t} m^t}$$

is an edge-to-mobile edge node transmission rate; and $$I_{i^t}/D_{i^t n_{i^t}} + I_{i^t}/D_{n_{i^t} m^t}$$

is a task uploading time, $K_{i^t}/c_{m^t}$ is a task processing time, and $$O_{i^t}/D_{m^t n_{i^t}} + O_{i^t}/D_{n_{i^t} i^t}$$

is a task downloading time.

15. The method of claim 14, wherein the assigning comprises:

constructing a weighted bipartite graph G comprising subgraphs $G^n$ according to the static edge node, where $G=\{G^1, G^2, \ldots, G^N\}$ and N is the number of subgraphs; and solving a Maximum Matching (MM) problem using the weighted bipartite graph;

wherein the weighted bipartite graph is constructed according to a set of the one or more user requests, the candidate set, and a profit of the static edge node; and the MM problem is solved using a Kuhn-Munkres (KM) algorithm.

16. The method of claim 15, wherein the profit of the static edge node is calculated according to:

$$profit_{i^t m^t} = \begin{cases} v_{i^t} - p_{i^t}, & \text{if } T_{i^t m^t} \leq T_{i^t}^{DDL}, \\ v_{i^t} - p_{i^t} - F_p^{i^t}(T_{i^t m^t} - T_{i^t}^{DDL}), & \text{if } T_{i^t m^t} > T_{i^t}^{DDL}. \end{cases}$$

where $profit_{i^t m^t}$ is the profit of the static edge node, $v_{i^t}$ is a valuation of the unhandled request for the static edge node, $p_{i^t}$ is a price of the unhandled request, $T_{i^t}^{DDL}$ is a deadline of task completion time, and $F_p^{i^t}$ is a penalty function.

17. The method of claim 16, wherein after the processing, the target mobile edge node is configured to submit a Proof of Participation (PoP) to the static edge node, wherein the PoP comprises an equipment identification number used to identify and track unique mobile edge nodes.

18. The method of claim 17, wherein when the target mobile edge node submits the PoP but does not complete the unhandled request, a reputation of the target mobile edge node is damaged.

19. The method of claim 17, wherein Proof of Assignment (PoA) is sent to the target mobile edge node before the processing and the target edge node is compensated for the processing by the static edge node based on the PoA.

20. The method of claim 1, wherein each mobile edge node of the one or more mobile edge nodes is a smart car, unmanned aerial vehicle (UAV) or robot.

* * * * *